(12) United States Patent
Daniel

(10) Patent No.: US 10,915,800 B2
(45) Date of Patent: Feb. 9, 2021

(54) IMAGE FORMING APPARATUS THAT ACQUIRES FIXED DATA AND PLURALITY OF PIECES OF VARIABLE DATA ACCORDING TO USER'S INSTRUCTION, AND EXECUTES VARIABLE PRINTING

(71) Applicant: KYOCERA Document Solutions Inc., Osaka (JP)

(72) Inventor: Carlota Teodocia Daniel, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/743,573

(22) Filed: Jan. 15, 2020

(65) Prior Publication Data

US 2020/0242433 A1 Jul. 30, 2020

(30) Foreign Application Priority Data

Jan. 24, 2019 (JP) .................................. 2019-010583

(51) Int. Cl.
*G06K 15/02* (2006.01)
*G06K 15/00* (2006.01)

(52) U.S. Cl.
CPC ....... *G06K 15/1897* (2013.01); *G06K 15/005* (2013.01); *G06K 15/025* (2013.01)

(58) Field of Classification Search
None
See application file for complete search history.

(56) References Cited

U.S. PATENT DOCUMENTS

| 5,016,048 A | * | 5/1991 | Watanabe | ........ G03G 15/04018 355/71 |
| 9,830,119 B1 | | 11/2017 | Magpayo | |
| 2006/0055975 A1 | * | 3/2006 | Toda | ................. H04N 1/00347 358/1.16 |
| 2008/0018922 A1 | * | 1/2008 | Tanaka | ............... H04N 1/32133 358/1.11 |
| 2009/0059245 A1 | * | 3/2009 | Konuma | ............ H04N 1/32203 358/1.2 |
| 2010/0027060 A1 | * | 2/2010 | Ogino | ................ H04N 1/00474 358/1.15 |

(Continued)

FOREIGN PATENT DOCUMENTS

JP 2018-060426 A 4/2018

*Primary Examiner* — Thomas D Lee
(74) *Attorney, Agent, or Firm* — IP Business Solutions, LLC

(57) ABSTRACT

A controller causes a display device, upon receipt of an instruction designating fixed data, to display a fixed image represented by the fixed data; generates, upon receipt of an instruction designating a position for generating a first region in the fixed image, a first position information on a basis of the position designated, and stores the first position information in the storage device; acquires, upon receipt of an instruction designating a plurality of pieces of variable data, the plurality of pieces of variable data through a data input device; and causes an image forming device to form on a recording medium an image, in which a variable image represented by the variable data is inserted as replacement in the first region in each page of the fixed image, on a basis of the fixed data, the first position information, and the plurality of pieces of variable data acquired.

9 Claims, 21 Drawing Sheets

(56) References Cited

U.S. PATENT DOCUMENTS

2010/0053681 A1* 3/2010 Sasaki .................. G06F 3/1205
358/1.15
2016/0147386 A1* 5/2016 Han .................... G06F 3/04842
715/838

* cited by examiner

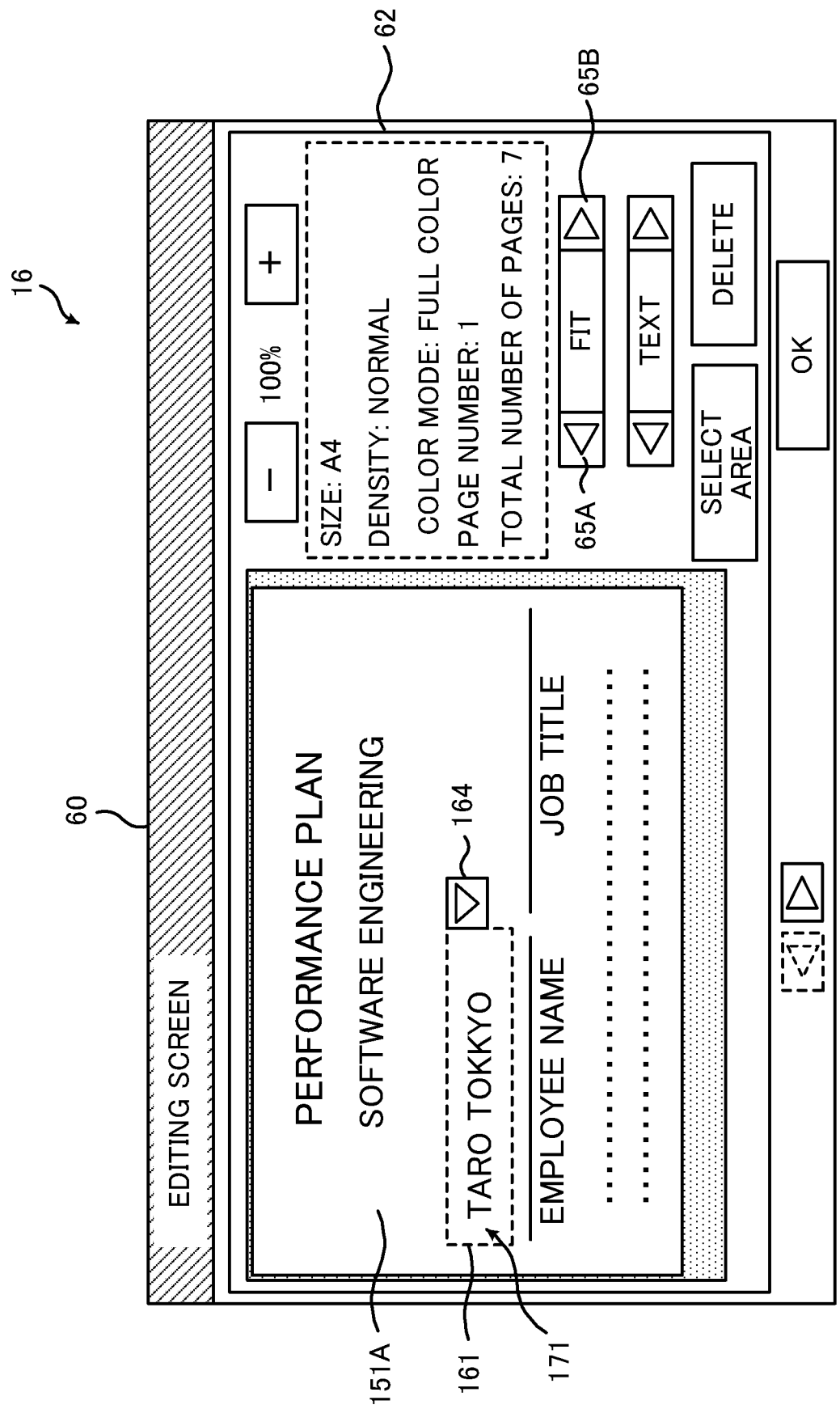

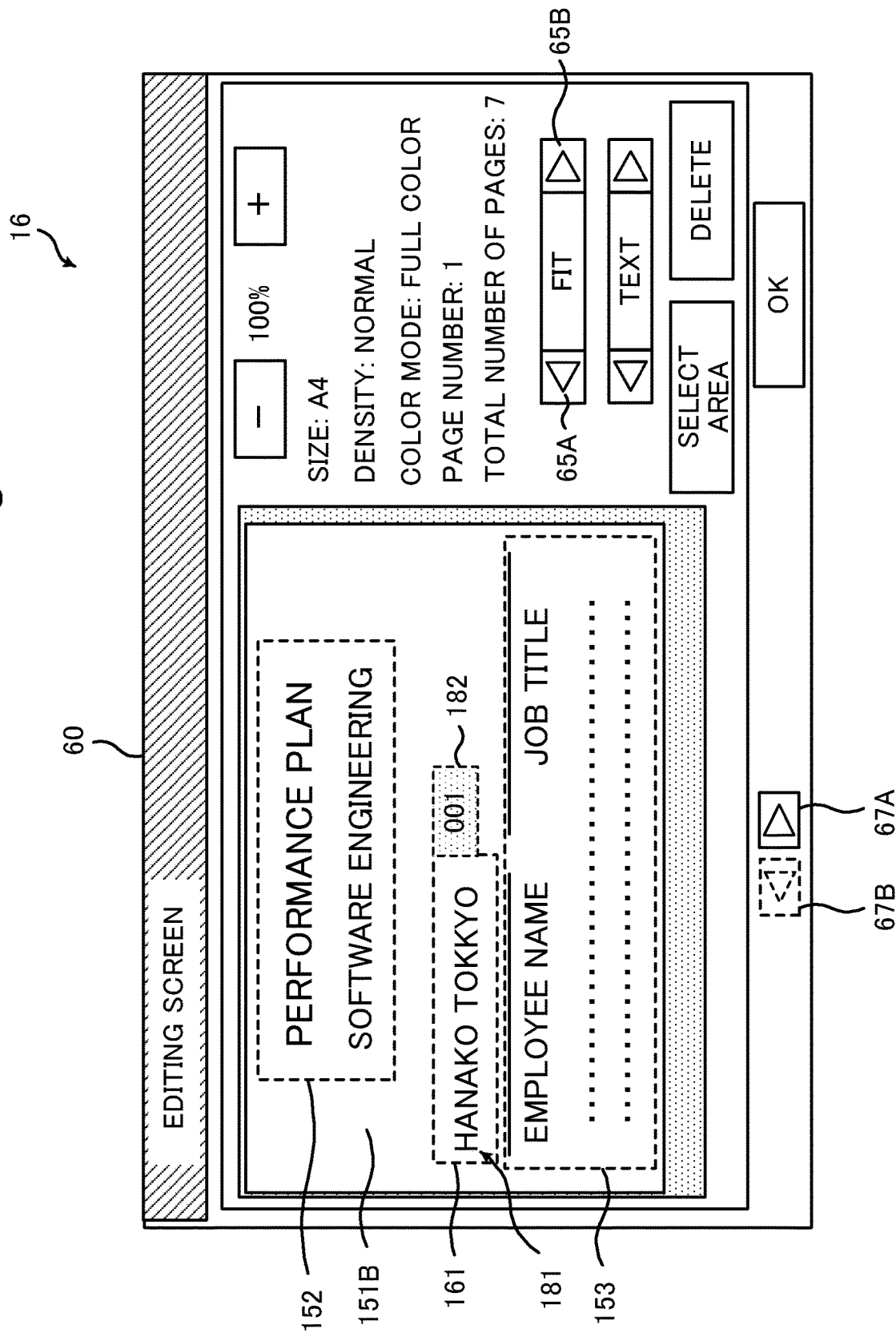

10,915,800 B2

IMAGE FORMING APPARATUS THAT ACQUIRES FIXED DATA AND PLURALITY OF PIECES OF VARIABLE DATA ACCORDING TO USER'S INSTRUCTION, AND EXECUTES VARIABLE PRINTING

INCORPORATION BY REFERENCE

This application claims priority to Japanese Patent Application No. 2019-010583 filed on Jan. 24, 2019, the entire contents of which are incorporated by reference herein.

BACKGROUND

The present disclosure relates to an image forming apparatus, and more particularly to a technique to execute variable printing.

A technique to generate an image, by inserting data extracted from another image file in a predetermined region of an image in an image file, is known. For example, an information processing apparatus is known that is configured to generate a document image, in which a character string, represented by data extracted from a file designated by the user, is located in a region located at a predetermined position in the image represented by the document.

SUMMARY

The disclosure proposes further improvement of the foregoing technique.

In an aspect, the disclosure provides an image forming apparatus including a storage device, an instruction input device, a data input device, an image forming device, a display device, and a control device. Into the instruction input device, an instruction of a user is inputted. Into the data input device, a plurality of pieces of variable data are inputted. The image forming device forms an image on a recording medium. The control device includes a processor, and acts, when the processor executes a control program, as a controller that: causes the display device, upon receipt of an instruction designating fixed data through the instruction input device, to display a fixed image represented by the designated fixed data; generates, upon receipt of an instruction designating a position for generating a first region in the displayed fixed image through the instruction input device, a first position information indicating the position of the first region in the fixed data on a basis of the designated position, and stores the first position information in the storage device; acquires, upon receipt of an instruction designating the plurality of pieces of variable data to be associated with the first region through the instruction input device, the designated plurality of pieces of variable data through the data input device; and causes the image forming device to form on the recording medium an image, in which an variable image respectively represented by each of the acquired plurality of pieces of variable data is inserted as replacement, for each page, in the first region in the fixed image on a basis of the fixed data, the first position information, and the acquired plurality of pieces of variable data.

BRIEF DESCRIPTION OF THE DRAWINGS

FIG. 18 is a schematic drawing showing another example of the editing screen displaying the variable image.

FIG. 19 is a schematic drawing showing another example of the editing screen displaying the image of a different page.

DETAILED DESCRIPTION

Figure 1:
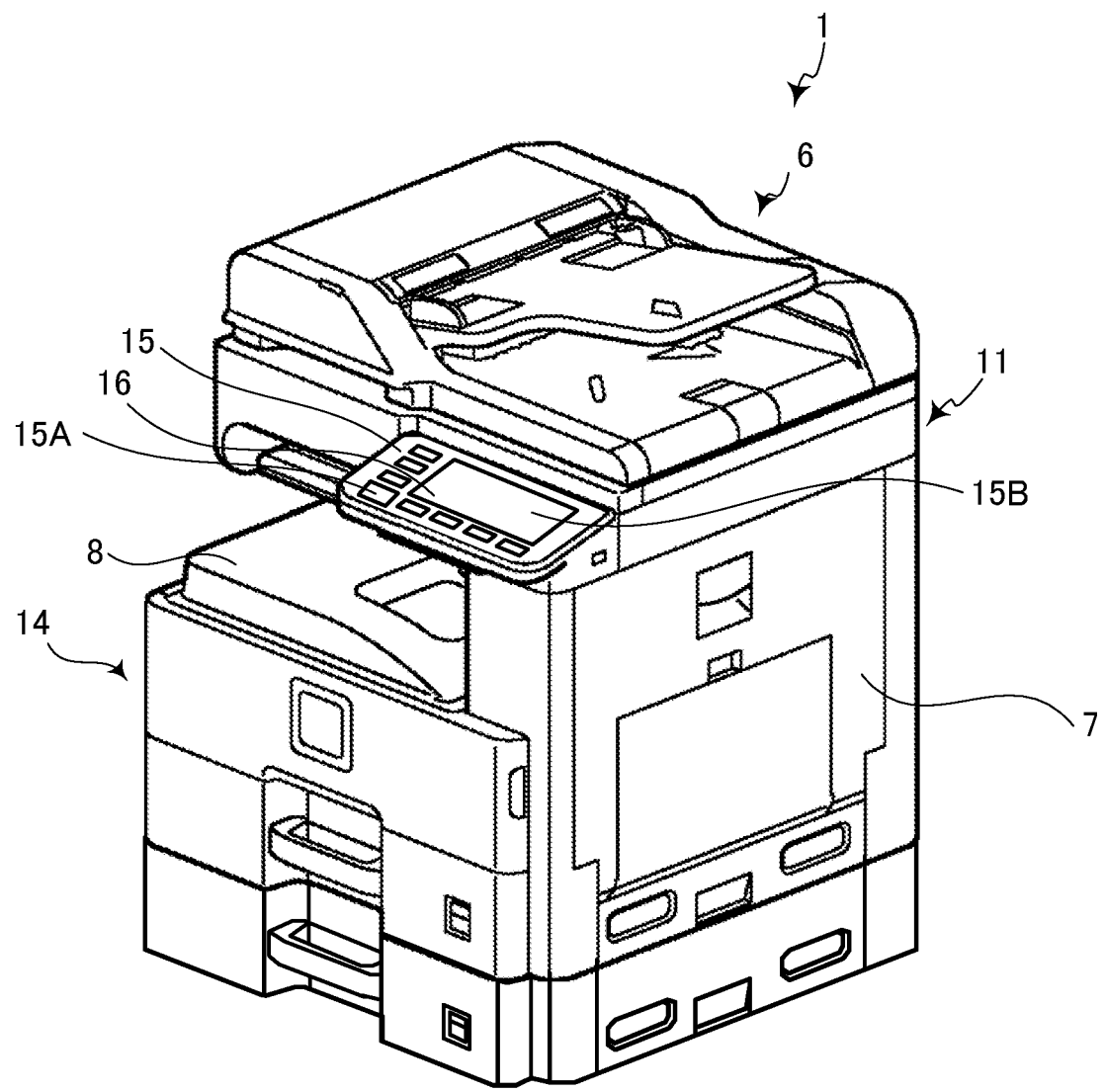
FIG. 1 is a perspective view showing an appearance of an image forming apparatus according to an embodiment of the disclosure.

Hereafter, an image forming apparatus according to an embodiment of the disclosure will be described, with reference to the drawings. FIG. 1 is a perspective view showing an appearance of the image forming apparatus according to the embodiment of the disclosure.

The image forming apparatus 1 is a multifunction peripheral having a plurality of functions, such as facsimile transmission, copying, printing, and scanning. In this embodiment, the image forming apparatus 1 is configured to execute variable printing, including forming on a recording sheet an image, in which a variable image represented by one of a plurality of pieces of variable data is inserted as replacement, in each page of a fixed image represented by fixed data.

Referring to FIG. 1, image forming apparatus 1 includes a plurality of components that perform various functions of the image forming apparatus 1, inside a casing 7. For example, an image reading device 11, an image forming device 12, a fixing device 13, and a paper feeding device 14 are provided inside the casing 7.

The image reading device 11 includes an automatic document feeder (ADF), having a document feeding device 6 that transports a source document, and a scanner that optically reads the source document transported by the document feeding device 6 or placed on a platen glass. The image reading device 11 emits light to the source document from a light emitter, and receives the reflected light with a charge-coupled device (CCD) sensor, to thereby read the source document and generate first image data.

The image forming device 12 includes a photoconductor drum, a charging device, an exposure device, a developing device, and a transfer device. The image forming device 12 forms a toner image on the recording sheet delivered from the paper feeding device 14, on the basis of the first image data generated by the image reading device 11, or image data transmitted from a personal computer or another facsimile machine connected via a network.

The fixing device 13 heats and presses the recording sheet on which the toner image has been formed by the image forming unit 12, to thereby fix the toner image on the recording sheet. After the fixing by the fixing device 13, the recording sheet having the image formed thereon is discharged to an output tray 8.

The paper feeding device 14 draws out recording sheets one by one with a pickup roller, from a paper cassette or a manual bypass tray, and delivers the recording sheets to the image forming device 12.

The image forming apparatus 1 includes an operation device 15. The user can input instructions, through the operation device 15, to execute various functions that the image forming apparatus 1 is configured to perform. The operation device 15 includes, as a hard key, a start key 15A for instructing to start the execution of the functions. The operation device 15 also includes a display device 16. The display device 16 includes, for example, an LCD. The display device 16 displays various types of screens related to the functions that the image forming apparatus 1 is configured to perform. The operation device 15 further includes a touch panel 15B overlaid on the display device 16. The operation device 15 exemplifies the instruction input device in What is claimed is.

Figure 2:
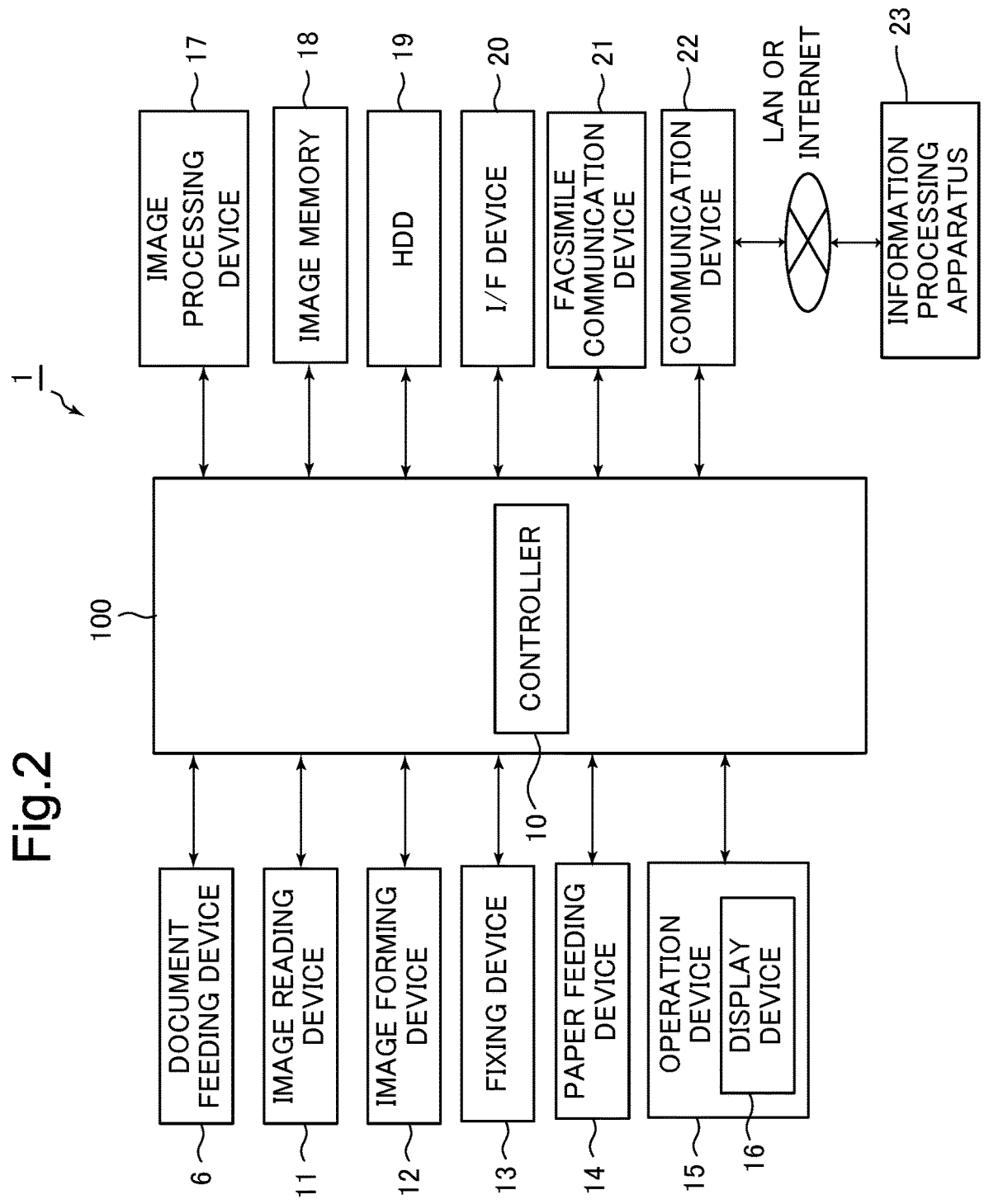
FIG. 2 is a block diagram showing an internal configuration of the image forming apparatus according to the embodiment of the disclosure.

FIG. 2 is a block diagram showing an internal configuration of the image forming apparatus 1 according to the embodiment of the disclosure. As shown in FIG. 2, the image forming apparatus 1 includes a control device 100. The control device 100 includes a processor, a random-access memory (RAM), and a read-only memory (ROM). The processor is, for example, a central processing unit (CPU), a micro processing unit (MPU), or an application specific integrated circuit (ASIC). The control device 100 acts as a controller 10, when the processor executes a control program stored in the ROM or a hard disk drive (HDD) 19 included in the control device 100.

The control device 100 is electrically connected to the document feeding device 6, the image reading device 11, the image forming device 12, the fixing device 13, the paper feeding device 14, the operation device 15, an image processing device 17, an image memory 18, the HDD 19, an interface (I/F) device 20, a facsimile communication device 21, and a communication device 22.

The control device 100 controls the overall operation of the image forming apparatus 1. To be more detailed, the control device 100 executes the functions of the components of the image forming apparatus 1, and makes communication with an information processing apparatus 23, such as a personal computer, connected via the network.

The image processing device 17 includes a raster image processor. The image processing device 17 processes, for example, the image data generated by the image reading device 11, as necessary. The image processing device 17 also executes a raster image processing with respect to an image file inputted, to thereby generate a bit map image.

The image memory 18 includes a region where, for example, the bit map image to be printed is temporarily stored.

The HDD 19 is a large-capacity storage device in which various types of data, such as the image file based on the image data generated by the image reading device 11, are stored. The HDD 19 contains various control programs for realizing basic functions of the image forming apparatus 1. HDD 19 exemplifies the storage device in What is claimed is.

The HDD 19 contains a variable printing data generation program, utilized to execute variable printing data generation according to this embodiment. When the processor operates according to the variable printing data generation program, the control device 100 acts as the controller 10, to execute the variable printing data generation process according to this embodiment. The variable printing data generation program is one of the aforementioned control programs.

The HDD 19 contains a variable printing program utilized to execute the variable printing according to this embodiment. When the processor operates according to the variable printing program, the control device 100 acts as the controller 10, to execute the variable printing process according to this embodiment. The variable printing program is one of the aforementioned control programs.

Here, the controller 10 may be constituted of hardware circuits to execute the functions, instead of being realized according to the control program, or may be realized by two or more control devices.

The I/F device 20 is a hot plug-compatible interface including, for example, a USB port. Accordingly, for example a USB memory can be connected to the I/F device 20. The I/F device 20 exemplifies the data input device in What is claimed is.

The facsimile communication device 21 is connectible to the public telephone network, and transmits and receives the image data through the public telephone network.

The communication device 22 includes a communication module such as a local area network (LAN) board. The image forming apparatus 1 performs data communication through the communication device 22, with the information processing apparatus 23 on the network, for example a personal computer.

A power source is connected to each of the functional components of the image forming apparatus 1, so that those components of the image forming apparatus 1 are activated, when power is supplied from the power source.

Operation

Hereunder, an operation of the image forming apparatus 1, performed when executing the variable printing data generation and the variable printing, will be described.

In the following description, the term "drag-and-drop" refers to a user's action of touching an image displayed on the display device 16 with his/her own finger, moving the image to a desired position with the finger kept in contact with the image, and removing the finger from the image. Hereinafter, the position where the user's finger is removed from the image at the end of the drag-and-drop will be referred to as a drop position.

Figure 3:
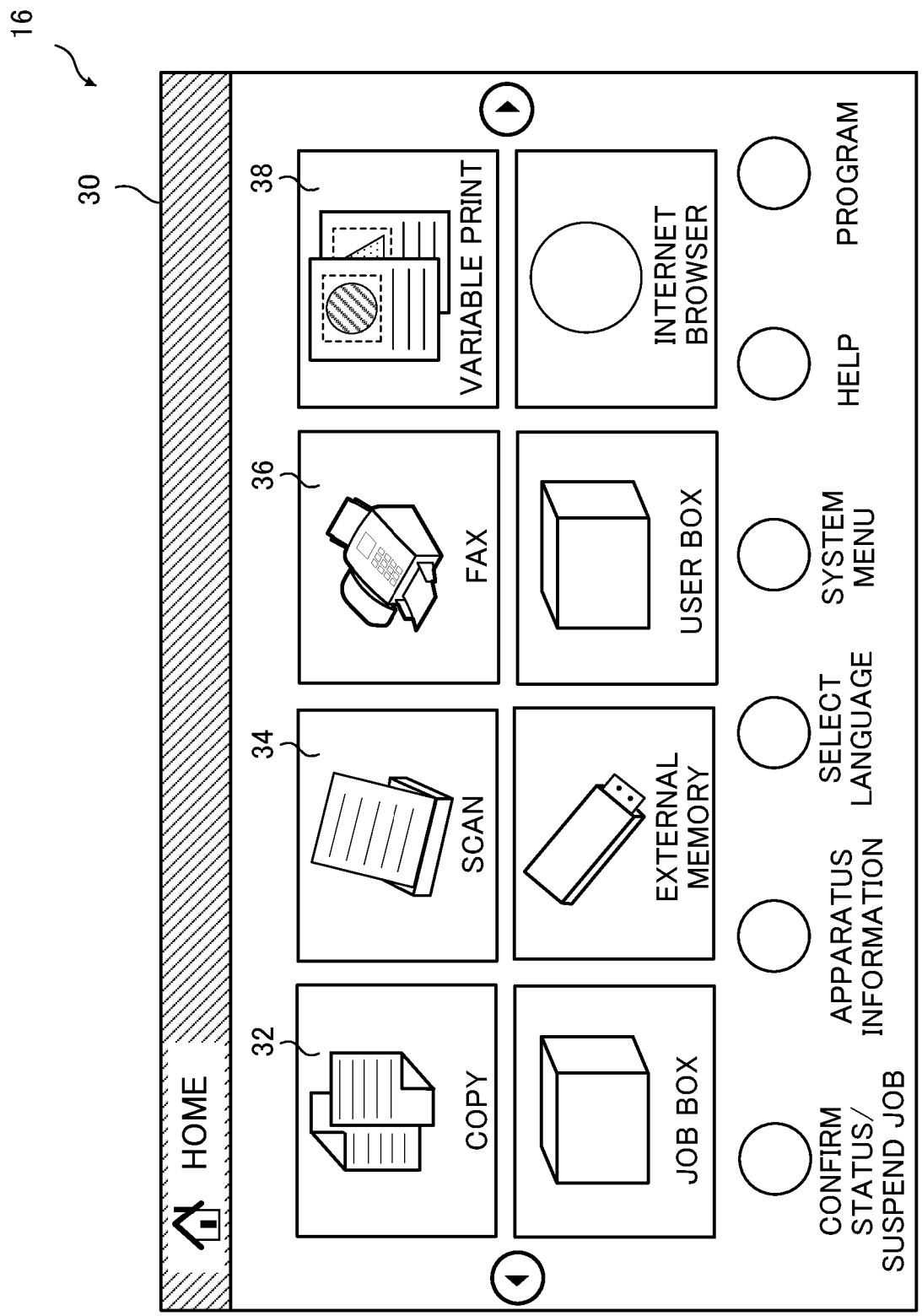
FIG. 3 is a schematic drawing showing an example of a home screen.

When the power for the image forming apparatus 1 is turned on, the controller 10 causes the display device 16 to display a home screen, for selecting one of the plurality of functions that the image forming apparatus 1 can perform. FIG. 3 illustrates an example of the home screen. Referring to FIG. 3, the controller 10 causes the display device 16 to display soft keys, including a key 32 for selecting the copying function, a key 34 for selecting the scanning function, a key 36 for selecting the facsimile function, and a key 38 for selecting the variable printing function, on the home screen.

To utilize the variable printing function, the user connects a USB memory in which a plurality of pieces of variable data are stored in advance, to the I/F device 20.

Figure 4:
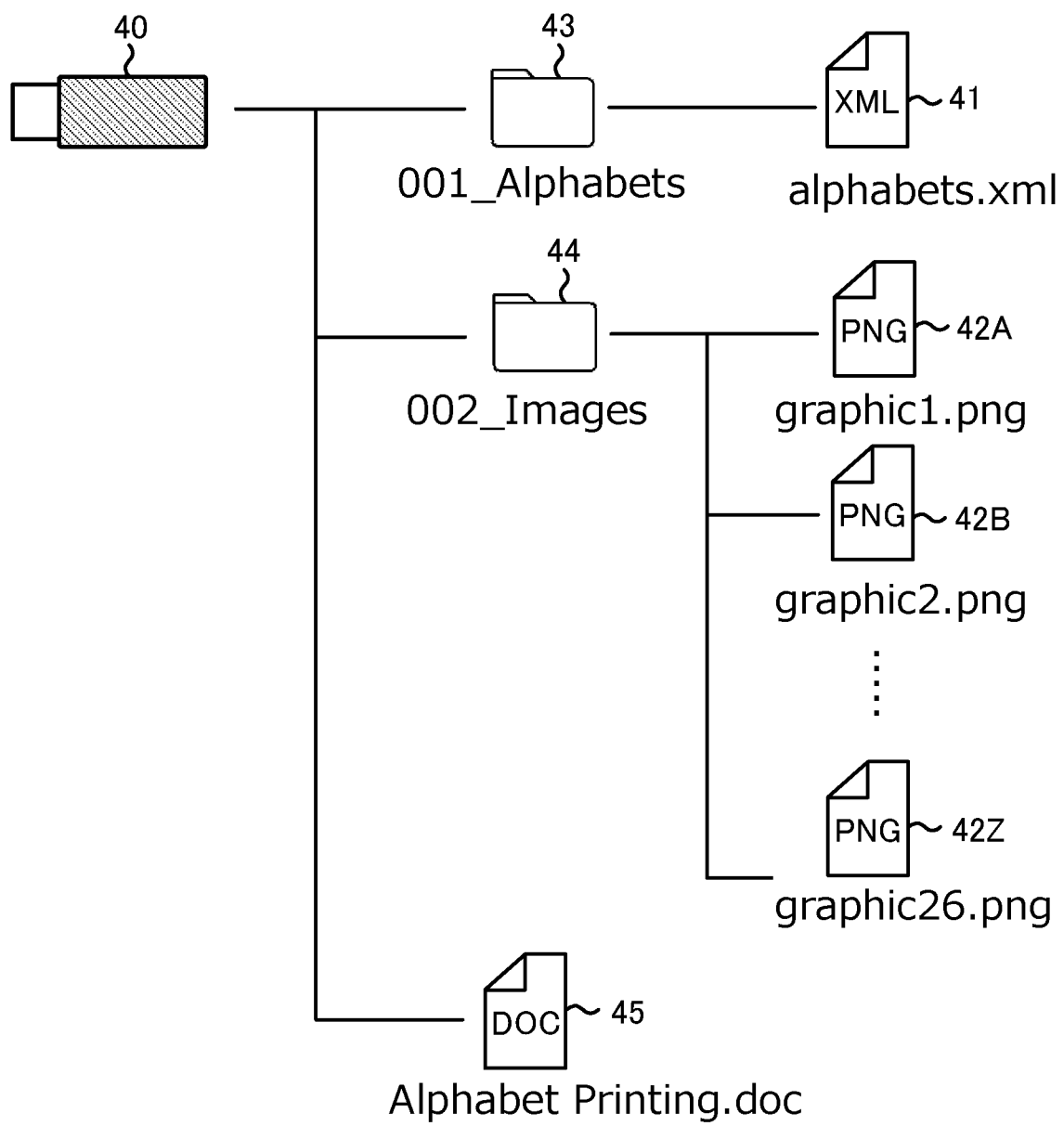
FIG. 4 is a schematic diagram showing examples of files stored in a universal serial bus (USB) memory.

FIG. 4 illustrates an example of the files stored in the USB memory. Referring to FIG. 4, the USB memory 40 contains a text file 41 of the XML format. The file 41 contains a plurality of pieces of variable data.

Figure 5:
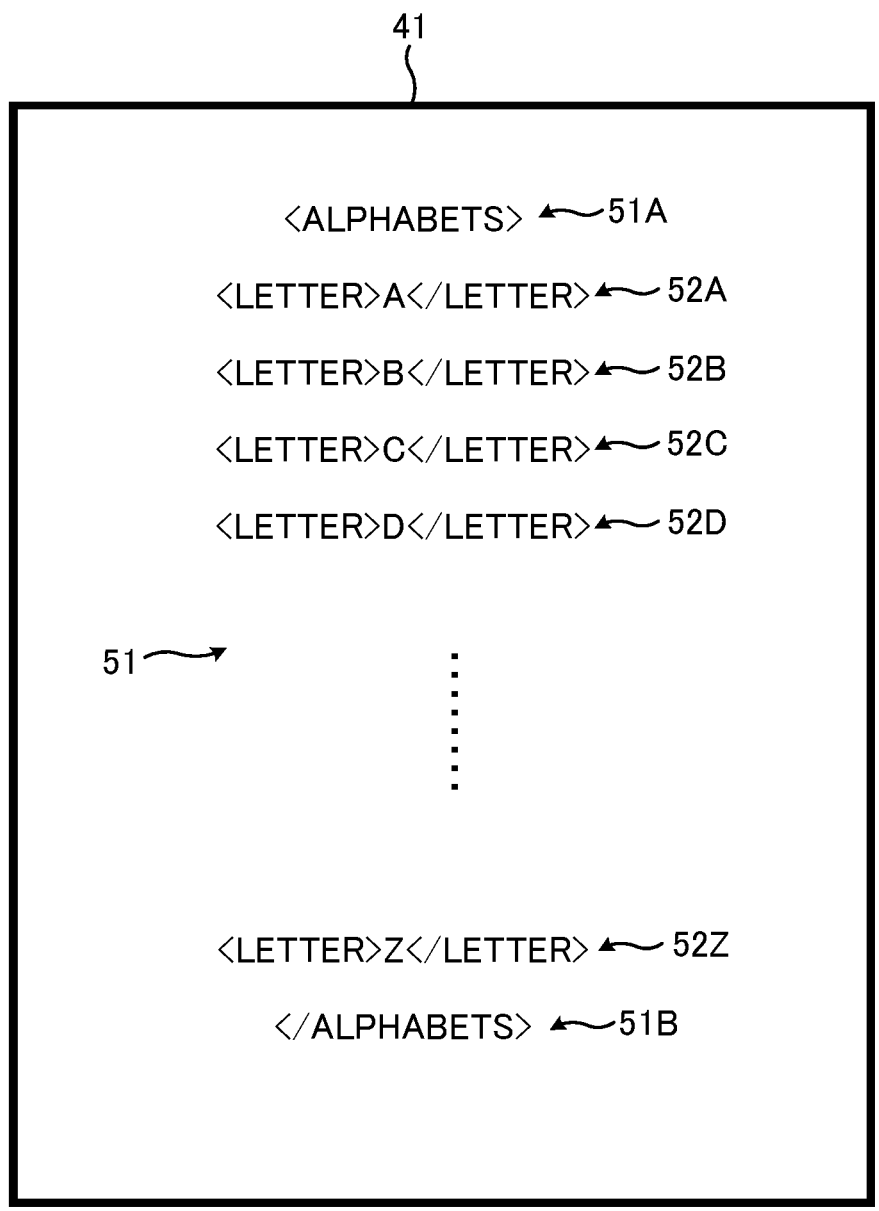
FIG. 5 is a schematic drawing showing an example of an extensible markup language (XML) file containing a plurality of pieces of variable data.

FIG. 5 illustrates an example of the XML file containing the plurality of pieces of variable data. Referring to FIG. 5, the file 41 includes a root element 51 having a tag named as "Alphabets". The root element 51 includes a start tag 51A named as "<Alphabets>", and an end tag 51B named as "</Alphabets>".

The file 41 includes a plurality of children 52A to 52Z, each having a tag named as "letter", between the start tag 51A and the end tag 51B. The children 52A to 52Z each include, as variable data, text data indicating one of the twenty-six alphabets, between the start tag and the end tag.

For example, the child 52A includes text data indicating a character "A", between the start tag "<letter>" and the end tag "</letter>". The child 52B includes text data indicating a character "B", between the start tag "<letter>" and the end tag "</letter>".

The children 52A to 52Z are aligned, from the start tag 51A toward the end tag 51B, such that the characters indicated by the text data respectively included in the children 52A to 52Z are arranged in alphabetical order. The order of the children 52A to 52Z from the start tag 51A toward the end tag 51B corresponds to the order in which the variable printing is executed. The first to the twenty-sixth text data, respectively included in the children 52A to 52Z, constitute one group.

Referring again to FIG. 4, the USB memory 40 contains twenty-six image files 42A to 42Z of the portable network graphics (PNG) format, as the variable data. The image files 42A to 42Z respectively correspond to the children 52A to 52Z, in the same order. For example, the image file 42A includes an image representing an "Apple", the initial of which is "A". The image file 42B includes an image representing a "Ball", the initial of which is "B".

The file names of the images file 42A to 42Z each include a numeral indicating the order in which the variable printing is executed. For example, the file name "graphicl.png" of the image file 42A includes the numeral "1", indicating that the image file 42A is at the first place. The file name "graphicl.png" of the image file 42B includes the numeral "2", indicating that the image file 42B is at the second place. The image files 42A to 42Z constitute one group.

The variable data is stored in a folder, by group. For example, the file 41 is stored in a folder 43, named as "001_Alphabets". The image files 42A to 42Z are stored in a folder 44, named as "002_Images". The numeral "001" given to the folder 43, and the numeral "002" given to the folder 44 are identification numbers for identifying the variable data on the basis of the group.

In this embodiment, as described above, the total number of pieces of the variable data in each group is the same. In other words, the total number of pieces of the text data, included as variable data in the file 41 stored in the folder 43, and the total number of the image files, stored as variable data in the folder 44, are equal.

The USB memory 40 further contains a file 45 of a word processor-compatible format, such as Microsoft Word (registered trademark). The file 45 is named as "Alphabet Printing. doc". The file 45 is stored in the USB memory 40 in a blank state, with no data inputted thereto. Since the file 45 does not include variable data, the file 45 is not stored in the folder to which an identification number is given.

After connecting the USB memory 40, the user touches the key 38 on the home screen 30, to select the variable printing function. Upon detecting through the touch panel 15B that the key 38 has been touched, the controller 10 causes the display device 16 to display an editing screen for generating the variable printing data.

Figure 6:
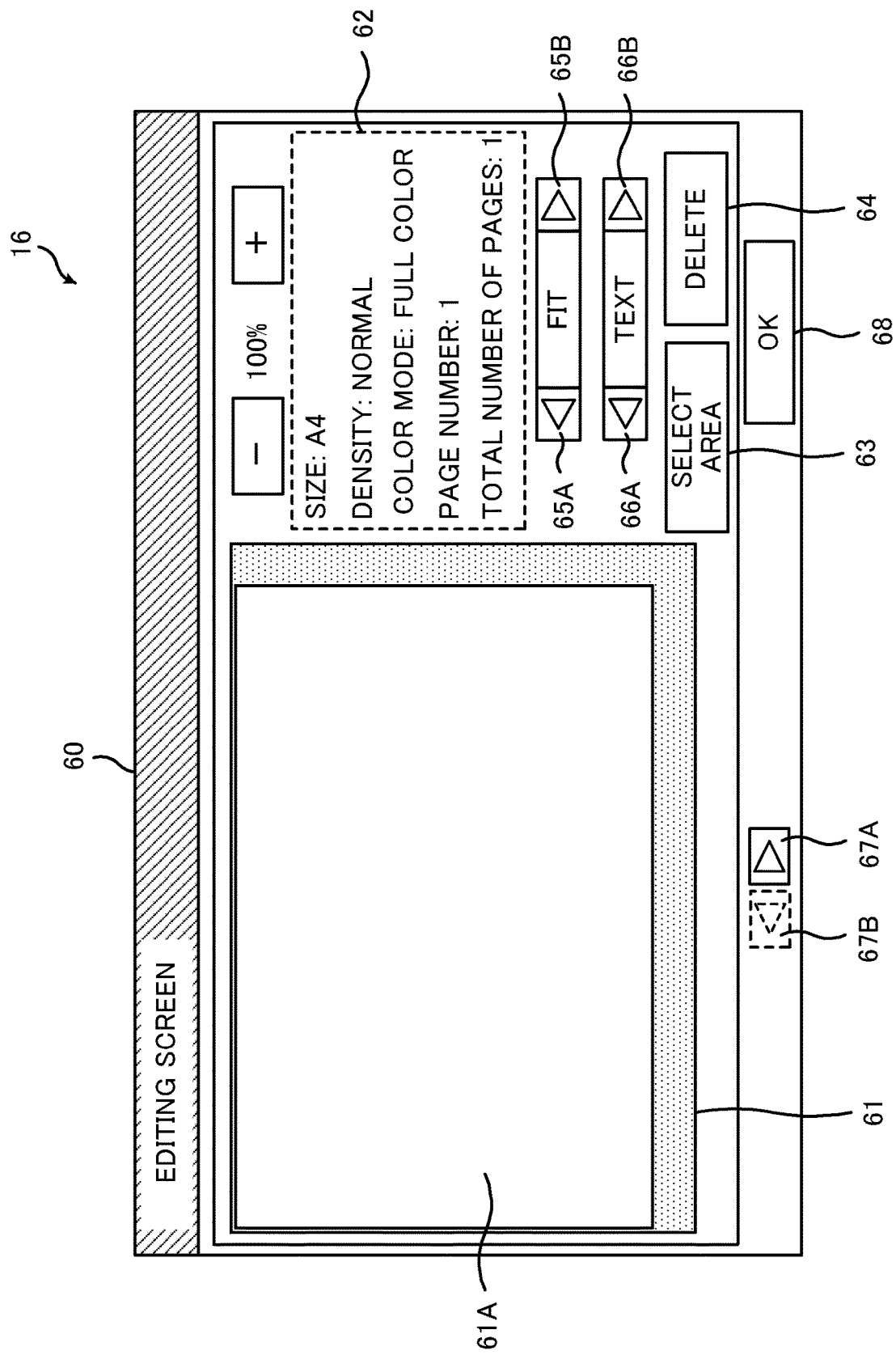
FIG. 6 is a schematic drawing showing an example of an editing screen including a plurality of pieces of variable data.

FIG. 6 illustrates an example of the editing screen. Referring to FIG. 6, the controller 10 causes the display device 16 to display, in the editing screen 60, a region 61, where an image based on the variable printing data is to be displayed, with respect to each page. At this point, the user inputs an instruction designating the file 45 stored in the USB memory 40 as the fixed data, through the operation device 15. The fixed data serves as the base for generating the variable printing data.

Upon receipt of the instruction designating the file 45, the controller 10 reads out the file 45 from the USB memory 40, and causes the display device 16 to display an image 61A indicated by the file 45 read out as above, in the region 61. The image 61A displayed at this point is the fixed image of the blank state.

The controller 10 also stores the fixed data information for identifying the fixed data, in the HDD 19. The fixed data information is not specifically limited, provided that the information allows the fixed data to be identified, but may be, for example, the path of the file, or the file name. In this example, the controller 10 stores the path of the file 45 in the HDD 19, as the fixed data information.

The controller 10 causes the display device 16 to display a region 62 for displaying setting information related to the variable printing, in the editing screen 60. More specifically, the region 62 includes the information indicating that the document size is set to "A4", the information indicating that the print density is set to "normal", the information indicating that the color mode is set to "full-color", the information indicating that the page number of the image currently displayed in the region 61 is "1", and the information indicating that the total number of pages of the image currently displayed in the region 61 is "1".

The editing screen 60 includes, as soft keys, a key 63 for inputting an instruction to generate an insertion region where a variable image or a non-variable image is to be inserted, a key 64 for inputting an instruction to delete the insertion region, and keys 65A and 65B for selecting one of "fit", "stretch", and "tile", as the layout of the insertion image inserted in the insertion region. In this example, "fit" is selected as a default layout of the insertion image.

Here, the term "non-variable image" refers to an image represented by non-variable data, to be inserted in common in all the pages in the fixed image, in the variable printing process.

When "fit" is selected as the layout of the insertion image, the controller 10 causes the display device 16 to display the insertion image in the insertion region, in an enlarged or reduced size so as to fit the size and shape of the insertion region. When "stretch" is selected, the controller 10 causes the display device 16 to display the insertion image in the insertion region, in an enlarged or reduced size such that the long sides of the insertion image fit inside the frame of the insertion region. When "tile" is selected, the controller 10 causes the display device 16 to display the insertion image in the insertion region, in a form of tiles paved inside the frame of the insertion region.

In the editing screen 60, the controller 10 also causes the display device 16 to display keys 66A and 66B, which are soft keys, for selecting one of "text", "date", and "time" as the item of the non-variable image to be inserted in the insertion region. When "text" is selected as the non-variable image, the controller 10 causes the display device 16 to display a character string inputted by the user as desired, as the non-variable image, in the insertion region. When "date" is selected, the controller 10 causes the display device 16 to display a character string indicating the date, such as "Jan. 1, 2019", as the non-variable image, in the insertion region. When "time" is selected, the controller 10 causes the display device 16 to display a character string indicating the time, such as "10:00", as the non-variable image, in the insertion region. In this example, "text" is selected as a default item of the non-variable image.

Further, the controller 10 causes the display device 16 to display, in the editing screen 60, soft keys including a key 67A for substituting the image displayed in the region 61 with the image of the next page, a key 67B for substituting the image displayed in the region 61 with the image of the previous page, and a key 68 for inputting an instruction to start the variable printing is inputted.

Variable Printing Data Generation Process

Figure 7A:
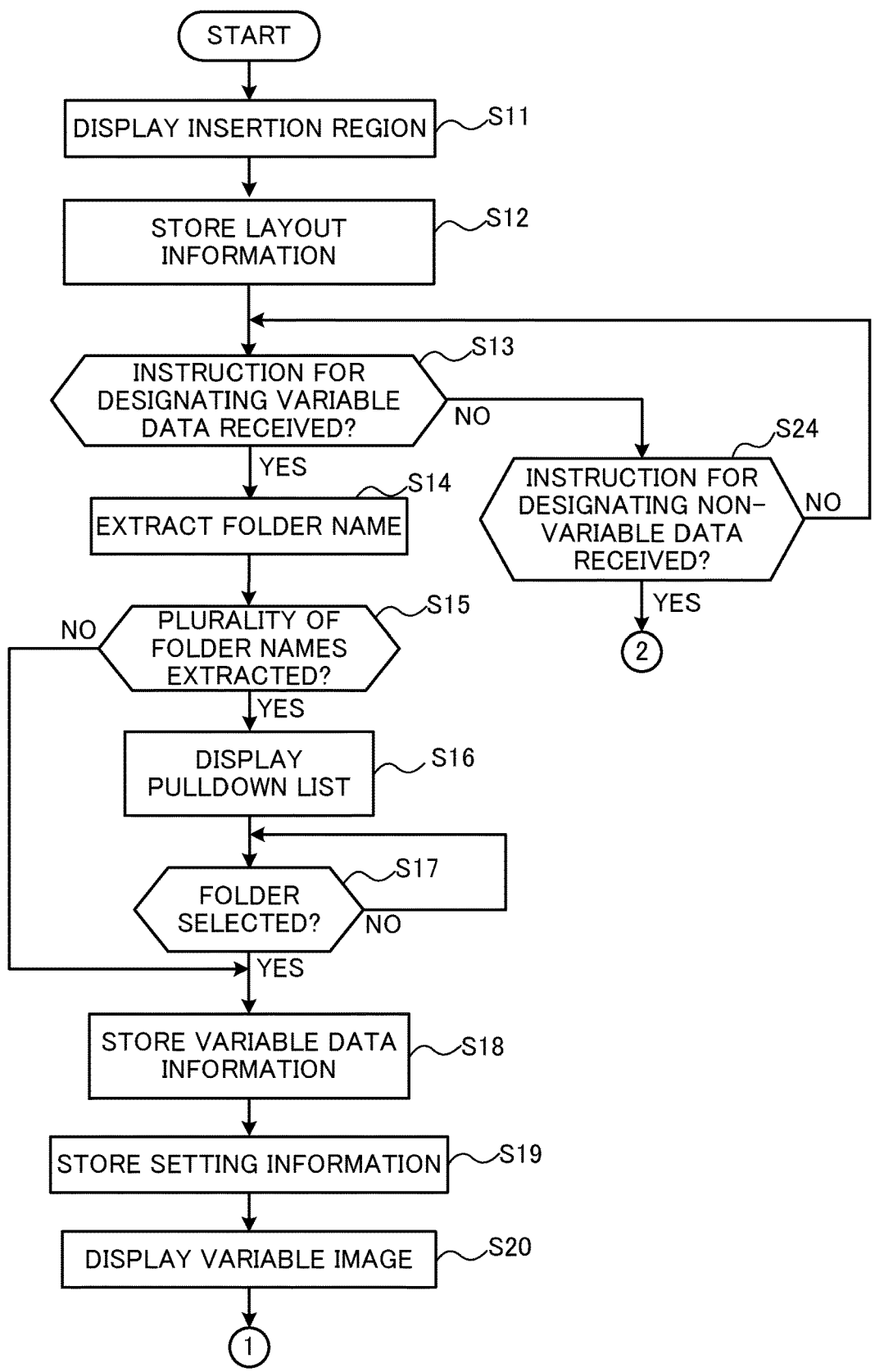
FIG. 7A is a flowchart showing a variable printing data generation process.
Figure 7B:
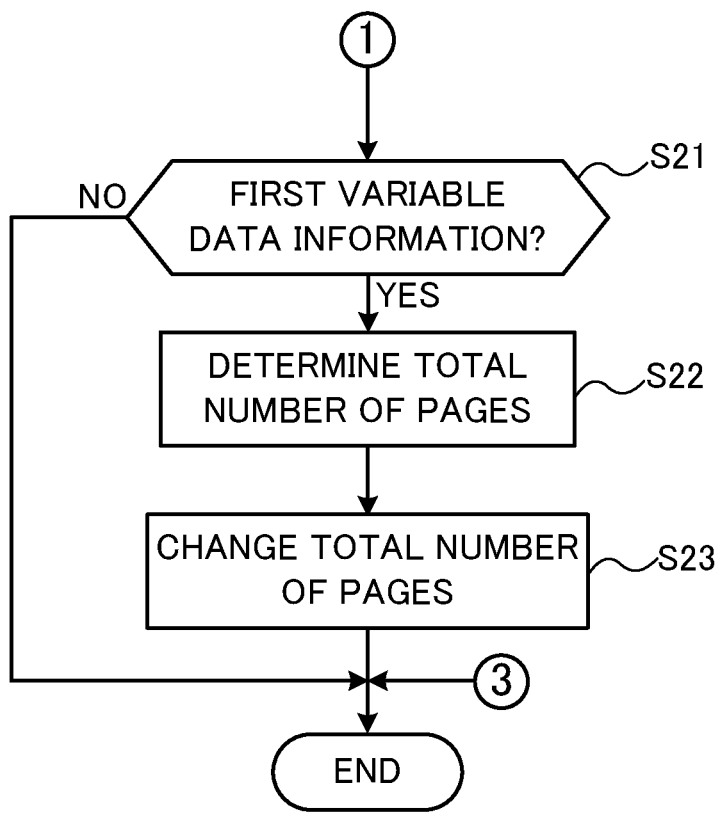
FIG. 7B is a flowchart showing the variable printing data generation process that follows the process of FIG. 7A.
Figure 7C:
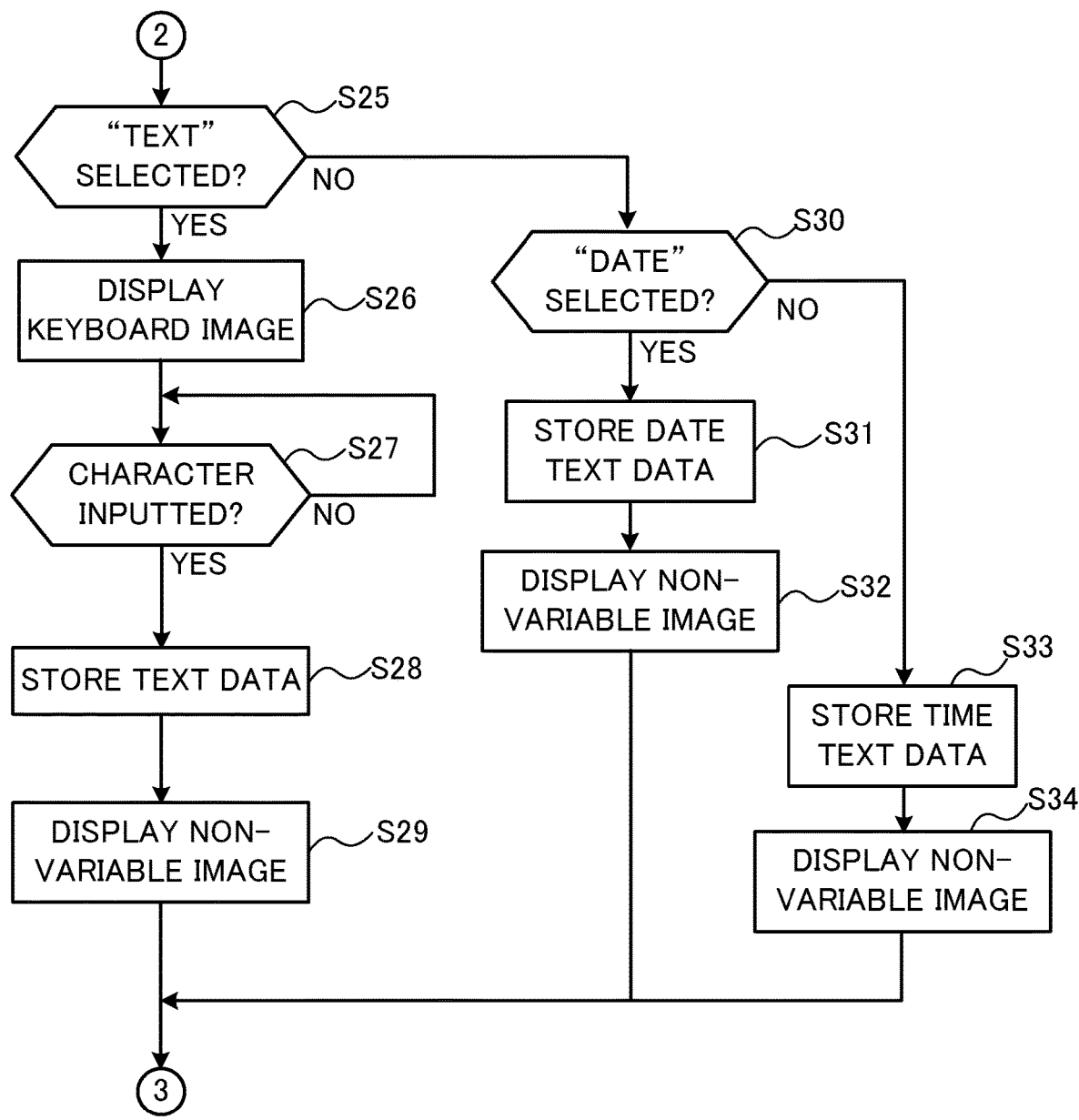
FIG. 7C is a flowchart showing the variable printing data generation process that follows the process of FIG. 7A.

FIG. 7A to FIG. 7C are flowcharts showing the variable printing data generation process according to this embodiment. Hereunder, a control arrangement for generating the variable printing data under the variable printing data generation program will be described, in linkage with the operation of the image forming apparatus 1.

The variable printing data generation program is executed by the controller 10, when the user performs the drag-and-drop operation of the key 63 on the editing screen 60, to input the instruction to generate the insertion region, with respect to the image displayed in the region 61. The controller 10 executes the variable printing data generation program, each time the instruction to generate the insertion region is inputted.

Figure 8:
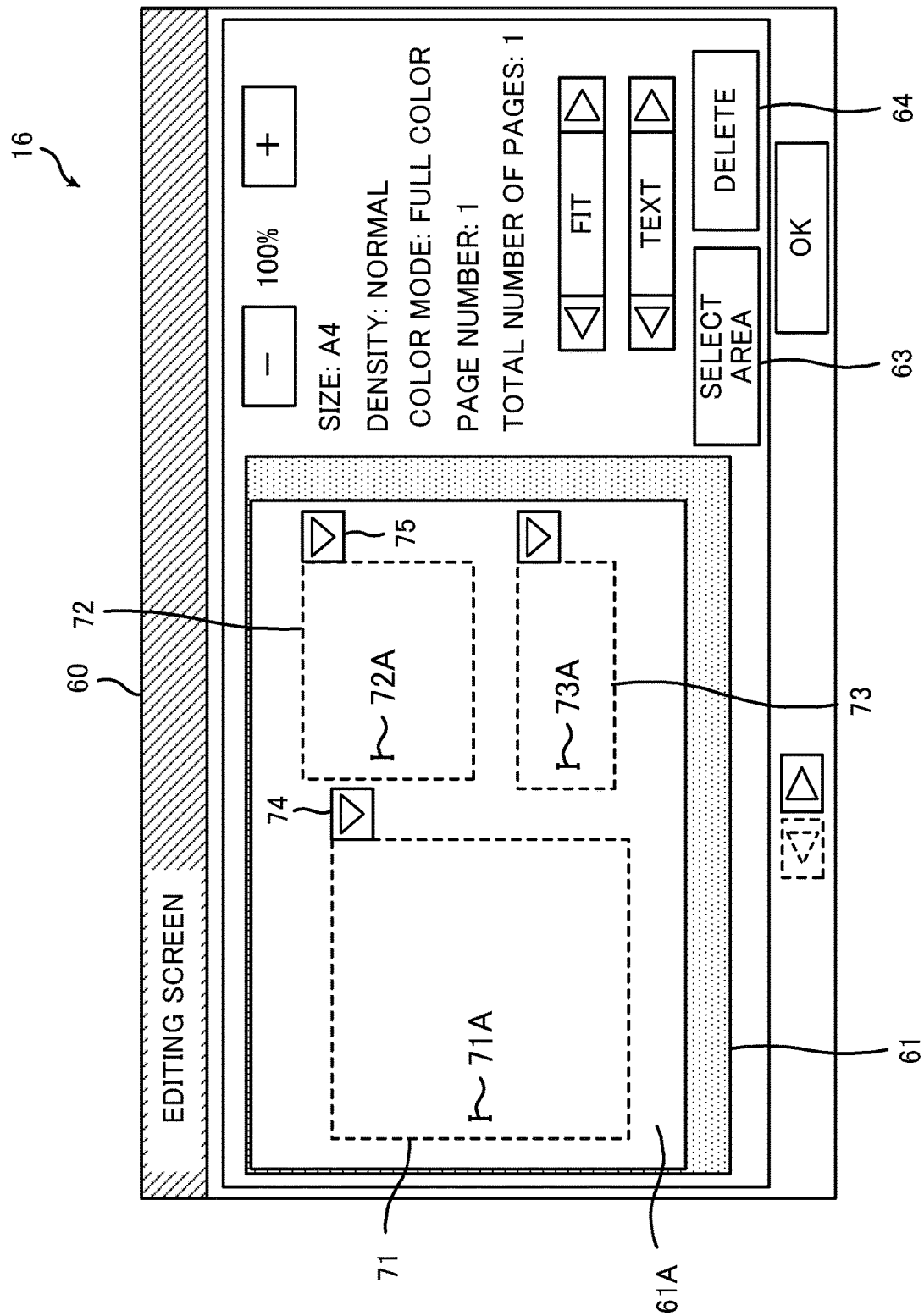
FIG. 8 is a schematic drawing showing an example of the editing screen, in which an insertion region is generated.

FIG. 8 illustrates an example of the editing screen, in which the insertion region is generated. First, to input the instruction to generate the insertion region, the user drags and drops the key 63 at a desired position on the image 61A displayed in the region 61. Referring to FIG. 7A and FIG. 8, the controller 10 starts the variable printing data generation, upon detecting the through the touch panel 15B that the key 63 has been dragged and dropped, and causes the display device 16 to display an insertion region 71 of a size and shape predetermined as default, at the drop position of the detected drag-and-drop operation (step S11).

The controller 10 also generates layout information including position information indicating the position of the insertion region 71 in the fixed data, size information indicating the size of the insertion region 71 with respect to the entirety of the fixed data, and shape information indicating the shape of the insertion region 71, and stores the layout information in the HDD 19 (step S12). The layout information is expressed, for example, in a form of coordinate information in the fixed data.

The user repeats the drag-and-drop operation of the key 63, as above. Each time the controller 10 detects the drag-and-drop operation performed on the key 63 through the touch panel 15B, the controller 10 starts the variable printing data generation and causes the display device 16 to display insertion regions 72 and 73 of a default size and shape, at the respective drop positions of the detected drag-and-drop operation (step S11).

The controller 10 also generates layout information of the insertion region 72 and the insertion region 73, and stores the layout information in the HDD 19 (step S12). Here, the insertion regions 71 and 72 exemplify the first region in What is claimed is. The insertion region 73 exemplifies the second region in What is claimed is. The position information of the insertion regions 71 and 72 exemplifies the first position information in What is claimed is. The position information of the insertion region 73 exemplifies the second position information in What is claimed is.

The controller 10 causes the display device 16 to display the insertion regions 71 to 73, each of which is surrounded by a frame drawn in broken lines, indicating the size and shape of the corresponding insertion region. The insertion regions 71 to 73 respectively include, inside the frame thereof, cursors 71A to 73A indicating the position where characters or numerals for constituting the non-variable image are to be inputted.

The user can input an instruction to change the position of the insertion regions 71 to 73, by dragging and dropping a position inside the frame of the insertion regions 71 to 73. The user can also input an instruction to change the size or shape of the insertion regions 71 to 73, by dragging and dropping the frame of the insertion regions 71 to 73.

Upon detecting the drag-and-drop operation performed on the frame, or on the position inside the frame of the insertion regions 71 to 73, through the touch panel 15B, the controller 10 causes the display device 16 to display the insertion regions 71 to 73 located at a different position, and in a different size and shape, in accordance with the drag-and-drop operation detected. The controller 10 also updates the layout information of the insertion regions 71 to 73 stored in the HDD 19, so as to reflect the changes in position, size, and shape.

Here, the user can input an instruction to delete one of the insertion regions 71 to 73, by selecting the insertion region to be deleted by a touch, and then touching the key 64. Upon detecting through the touch panel 15B that the key 64 has been touched, the controller 10 causes the display device 16 to erase the display of the selected one of the insertion regions 71 to 73, and also deletes the layout information of the selected one of the insertion regions 71 to 73, from the HDD 19.

After storing the layout information, the controller 10 stands by for receipt of an instruction for designating the plurality of pieces of variable data to be associated with the insertion region (NO at step S13), or for receipt of an instruction for designating the non-variable data to be associated with the insertion region (NO at step S24). The user touches a button 74 displayed close to the insertion region 71, to designate the plurality of pieces of variable data to be associated with the insertion region 71.

Figure 9:
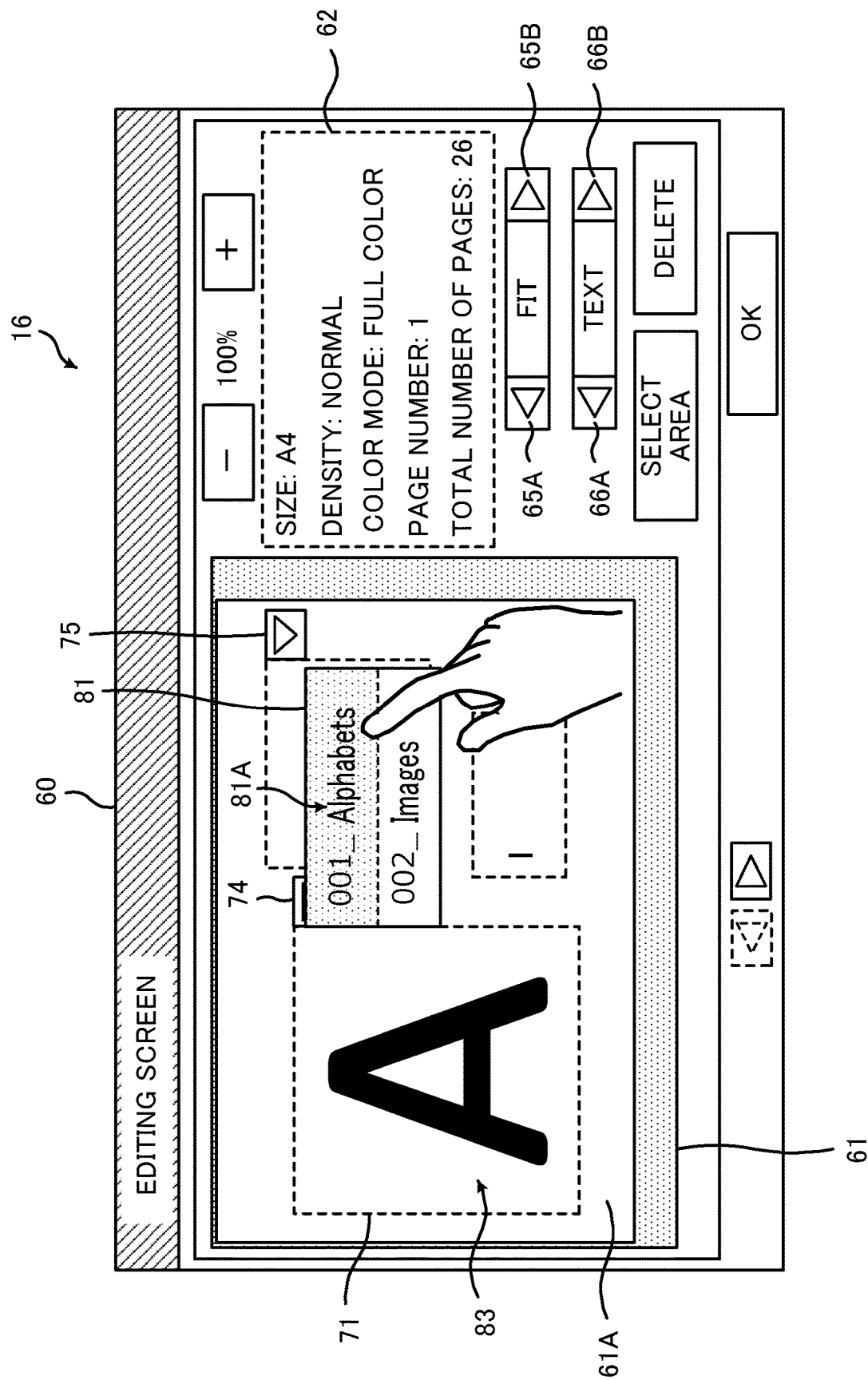
FIG. 9 is a schematic drawing showing an example of the editing screen for designating a plurality of pieces of variable data to be associated with the insertion region.

FIG. 9 illustrates an example of the editing screen, for designating the plurality of pieces of variable data to be associated with the insertion region. Upon detecting through the touch panel 15B that the button 74 has been touched, the controller 10 decides that the instruction for designating the plurality of pieces of variable data to be associated with the insertion region 71 has been received (YES at step S13), and extracts all the folder names having the identification number, from the information stored in the USB memory 40 (step S14). In this example, the controller 10 extracts the folder names of "001_Alphabets" and "002_Images", from the information stored in the USB memory 40.

After extracting the folder names, the controller 10 decides whether a plurality of folder names have been extracted (step S15). In this example, the controller 10 decides that a plurality of folder names have been extracted (YES at step S15), and causes the display device 16 to display, as shown in FIG. 9, a pulldown list 81 including all the folder names extracted, so as to superpose the pulldown list 81 on the button 74 (step S16). In this example, the pulldown list 81 includes the items "001_Alphabets" and "002_Images". After the pulldown list 81 is displayed, the controller 10 stands by for receipt of an instruction to select the folder (NO at step S17).

The user touches a region 81A, where the item "001_Alphabets" in the pulldown list 81 is displayed, thereby inputting the instruction to select the folder 43. Upon detecting through the touch panel 15B that the region 81A has been touched, the controller 10 decides that the instruction to select the folder 43 has been received (YES at step S17), and identifies the plurality of pieces of variable data to be associated with the insertion region 71, according to the file stored in the folder 43 in the USB memory 40. Then the controller 10 stores the variable data information indicating the plurality of pieces of variable data identified, in association with the layout information of the insertion region 71, in the HDD 19 (step S18).

More specifically, upon recognizing that the file 41 stored in the folder 43 is an XML file, in other words a text file, the controller 10 identifies the first to the twenty-sixth text data, respectively included in the children 52A to 52Z, as the plurality of pieces of variable data to be associated with the insertion region 71, and stores the variable data information indicating the identified variable data in the HDD 19, in association with the layout information of the insertion region 71.

The variable data information is not specifically limited, provided that the information allows the variable data to be identified. In this embodiment, the variable data information includes at least the path of the folder containing the variable data, and information indicating the file format of the file containing the variable data. In this example, the controller 10 stores the path of the folder 43, the file format of the file 41, and the information indicating the first to the twenty-sixth text data in the HDD 19, as the variable data information.

The controller 10 also stores setting information indicating that the layout of the insertion image is set to "fit", in association with the layout information of the insertion region 71, in the HDD 19 (step S19).

After storing the setting information, the controller 10 extracts first text data from the folder 43 in the USB memory 40, on the basis of the variable data information associated with the insertion region 71, and causes the display device 16 to erase the display of the cursor 71A, and display the image 61A, in which a variable image 83, expressing the character "A" indicated by the first text data extracted, is located inside the frame of the insertion region 71 (step S20).

Since "fit" is selected as the layout of the insertion image, the controller 10 enlarges or reduces the size of the first text data, such that the entirety of the variable image 83 fits in the size and shape of the insertion region 71.

Here, in the case where only a single folder name has been extracted, and the controller 10 decides that a plurality of folder names have not been extracted (NO at step S15), the controller 10 skips the operation of step S16 and step S17, and proceeds to step S18.

Referring to FIG. 7B, after the variable image 83 is displayed, the controller 10 decides whether the variable data information stored at step S18 is the variable data information first stored in the HDD 19, with respect to the fixed data that is the object of the variable printing data generation (step S21). In this example, the controller 10 decides that the variable data information associated with the insertion region 71 is the variable data information first stored in the HDD 19 (YES at step S21), and determines the total number of pieces of the variable data indicated by the variable data information, as the total number of pages of the image displayed in the region 61 (step S22).

More specifically, the controller 10 determines the value "26", which is the total number of pieces of the first to the twenty-sixth text data indicated by the variable data information associated with the insertion region 71, as the total number of pages of the image displayed in the region 61. The controller 10 changes the information indicating the total number of pages, currently displayed in the region 62, from "1" to "26" in accordance with the value determined as above (step S23). Upon changing the total number of pages, the controller 10 finishes the variable printing data generation.

Figure 10:
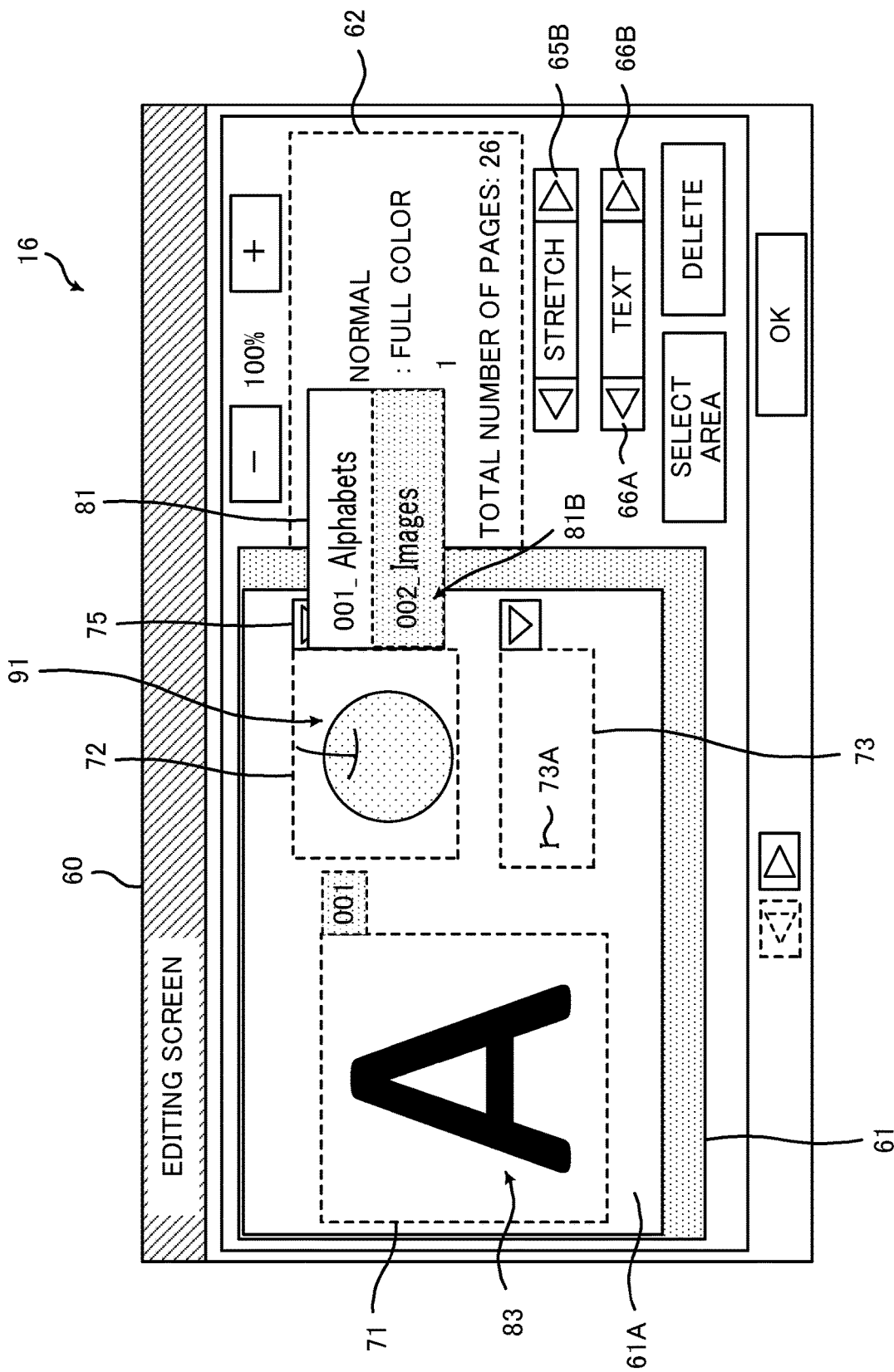
FIG. 10 is a schematic drawing showing another example of the editing screen for designating a plurality of pieces of variable data to be associated with the insertion region.

FIG. 10 illustrates another example of the editing screen for designating the plurality of pieces of variable data to be associated with the insertion region. The user touches a button 75 displayed close to the insertion region 72, to thereby designate the plurality of pieces of variable data to be associated with the insertion region 72.

Referring again to FIG. 7A, upon detecting through the touch panel 15B that the button 75 has been touched, the controller 10 decides that the instruction for designating the plurality of pieces of variable data to be associated with the insertion region 72 has been received (YES at step S13), and extracts, similarly to the case of detecting the touch operation on the button 74, all the folder names having the identification number, namely the folder names "001_Alphabets" and "002_Images" USB, from the information stored in the memory 40 (step S14).

After extracting the folder names, the controller 10 decides whether a plurality of folder names have been extracted (step S15). Referring to the example shown in FIG. 10, the controller 10 decides that a plurality of folder names have been extracted (YES at step S15), and causes the display device 16 to display the pulldown list 81 including the items "001_Alphabets" and "002_Images", so as to superpose the pulldown list 81 on the button 74 (step S16). After the pulldown list 81 is displayed, the controller 10 stands by for receipt of an instruction to select the folder (NO at step S17).

The user touches the region 81B, where the item "002_Images" in the pulldown list 81 is displayed, thereby inputting the instruction to select the folder 44. Upon detecting through the touch panel 15B that the region 81B has been touched, the controller 10 decides that the instruction to select the folder 44 has been received (YES at step S17), and identifies the plurality of pieces of variable data to be associated with the insertion region 72, according to the file stored in the folder 44 in the USB memory 40. Then the controller 10 stores the variable data information indicating the plurality of pieces of variable data identified, in association with the layout information of the insertion region 72, in the HDD 19 (step S18).

More specifically, upon recognizing that the files 42A to 42Z stored in the folder 44 are PNG files, in other words image files, the controller 10 identifies the image file 42A to 42Z as the plurality of pieces of variable data to be associated with the insertion region 72, and stores the variable data information indicating the identified variable data in the HDD 19, in association with the layout information of the insertion region 72.

In this example, the controller 10 stores the path of the folder 44, and the file format of the image files 42A to 42Z in the HDD 19, as the variable data information.

The controller 10 also stores the setting information indicating that the layout of the insertion image is set to "fit", in association with the layout information of the insertion region 72, in the HDD 19 (step S19).

After storing the setting information, the controller 10 reads out the first image file 42A from the folder 44 in the USB memory 40, on the basis of the variable data information associated with the insertion region 72, and causes the display device 16 to erase the display of the cursor 72A, and display the image 61A, in which the variable image 91, representing "Apple" indicated by the image file 42A read out is located inside the frame of the insertion region 72 (step S20).

Since "fit" is selected as the layout of the insertion image at this point, the controller 10 enlarges or reduces the size of the image file 42A, such that the entirety of the variable image 91 fits in the size and shape of the insertion region 72.

When "fit" is selected as the layout of the insertion image as above, the aspect ratio of the insertion image before the enlargement or reduction may fail to be maintained, which may make the insertion image unclear. In this example, it will be assumed that the variable image 91 displayed in the insertion region 72 has become unclear. The user touches the key 65B, to thereby change the layout of the insertion image to "stretch".

Upon detecting through the touch panel 15B that the key 65B has been touched, the controller 10 changes the character string displayed in the editing screen 60 from "fit" to "stretch", and enlarges or reduces the size of the image file 42A of the original state, unchanged for the layout of "fit", such that the long sides of the variable image 91 fits inside the frame of the insertion region 72.

The controller 10 causes the display device 16 to display the variable image 91 based on the image file 42A, the size of which has been changed as above, inside the frame of the insertion region 72. Accordingly, the variable image 91 is clearly displayed, with the aspect ratio maintained unchanged.

The controller 10 also updates the setting information of the insertion region 72 stored in the HDD 19, so as to indicate that the layout of the insertion image is set to "stretch".

Referring again to FIG. 7B, after the variable image 91 is displayed, the controller 10 decides whether the variable data information stored at step S18 is the variable data information first stored in the HDD 19 (step S21). In this example, since the variable data information associated with the insertion region 71 is already stored in the HDD 19, the controller 10 decides that the variable data information associated with the insertion region 72 is not the variable data information first stored in the HDD 19 (NO at step S21), and finishes the variable printing data generation, without determining the total number of pages of the image displayed in the region 61 (step S22).

The user touches the cursor 73A displayed inside the frame of the insertion region 73, to thereby designate the non-variable data to be associated with the insertion region 73.

Referring to FIG. 7A and FIG. 7C, upon detecting through the touch panel 15B that the cursor 73A has been touched, the controller 10 decides that the instruction for designating the non-variable data to be associated with the insertion region 73 has been received (YES at step S24), and decides whether "text" is selected as the content of the non-variable image to be inserted in the insertion region (step S25).

Figure 11:
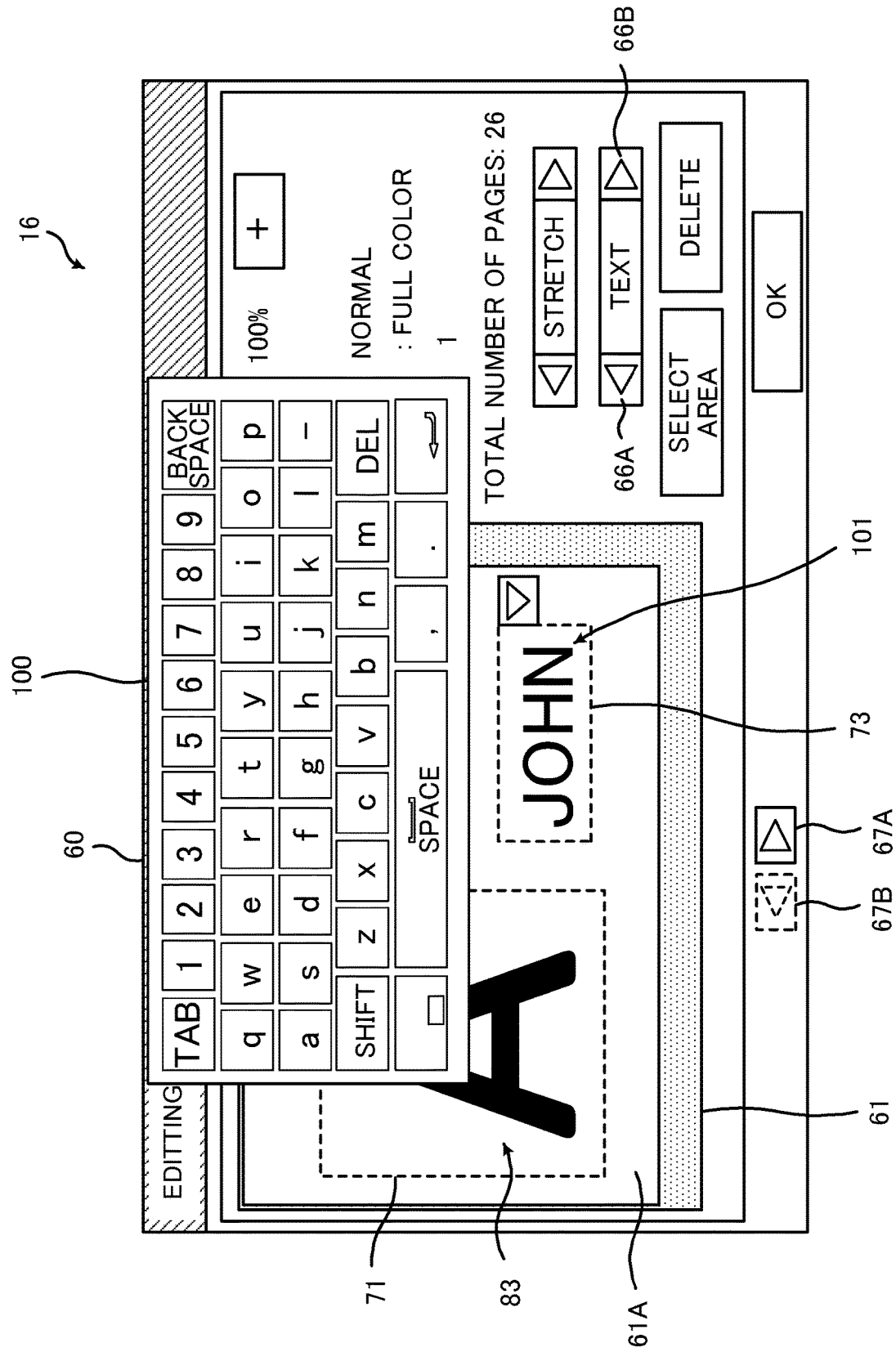
FIG. 11 is a schematic drawing showing an example of the editing screen for designating a non-variable data to be associated with the insertion region.

FIG. 11 illustrates an example of the editing screen for designating the non-variable data to be associated with the insertion region. Referring to the example shown in FIG. 11, the controller 10 decides that "text" is selected as the content of the non-variable image (YES at step S25), and causes the display device 16 to display a keyboard image 100, including a plurality of soft keys for inputting characters or numerals, so as to superpose the keyboard image 100 on the editing screen 60 (step S26). After the keyboard image 100 is displayed, the controller 10 stands by for an input of a character or a numeral made through the keyboard image 100 (NO at step S27).

The user inputs a character string "JOHN", by touching the soft keys of the keyboard image 100. Upon detecting through the touch panel 15B that the soft keys of the keyboard image 100 have been touched, the controller 10 decides that the characters have been inputted (YES at step S27). The controller 10 then acquires the text data indicating the inputted characters as the non-variable data, and stores the non-variable data in the HDD 19, in association with the layout information of the insertion region 73 (step S28).

After storing the non-variable data, the controller 10 causes the display device 16 to erase the display of the cursor 73A, and display a non-variable image 101 representing the character string "JOHN" indicated by the text data acquired, inside the frame of the insertion region 73 (step S29). After the non-variable image 101 is displayed, the controller 10 finishes the variable printing data generation.

Here, the user can touch the key 66A or key 66B before touching the cursor 73A, to change the non-variable image to be inserted in the insertion region to "date" or "time".

For example, when "date" is selected as the content of the non-variable image, the controller 10 decides that "date" is selected as the content of the non-variable image (NO at step S25, YES at step S30), and acquires, using a known timer function, date information indicating the date that the touch operation on the cursor 73A has been detected through the touch panel 15B. The controller 10 also acquires date text data indicating the character string representing the date indicated by the date information acquired, as the non-variable data, and stores the non-variable data in the HDD 19, in association with the layout information of the insertion region 73 (step S31).

After storing the non-variable data, the controller 10 causes the display device 16 to erase the display of the cursor 73A, and display the image 61A, such that the non-variable image, for example representing the character string "Jan. 1, 2019", indicated by the date text data acquired, is located inside the frame of the insertion region 73 (step S32). After the non-variable image is displayed, the controller 10 finishes the variable printing data generation.

In the case where "time" is selected as the content of the non-variable image, the controller 10 decides that "date" is not selected as the content of the non-variable image (NO at step S30), and acquires, using a known timer function, the time information indicating the time that the touch operation on the cursor 73A has been detected through the touch panel 15B. The controller 10 also acquires time text data indicating the character string representing the time indicated by the time information acquired, as the non-variable data, and stores the non-variable data in the HDD 19, in association with the layout information of the insertion region 73 (step S33).

After storing the non-variable data, the controller 10 causes the display device 16 to erase the display of the cursor 73A, and display the image 61A, such that the non-variable image, for example representing the character string "10:00", indicated by the time text data acquired, is located inside the frame of the insertion region 73 (step S34). After the non-variable image is displayed, the controller 10 finishes the variable printing data generation.

Through the mentioned process, the controller 10 stores the fixed data information, the variable data information, the non-variable data, the layout information of the insertion regions 71 to 73, and the setting information, which are the constituents of the variable printing data, in the HDD 19.

Figure 12:
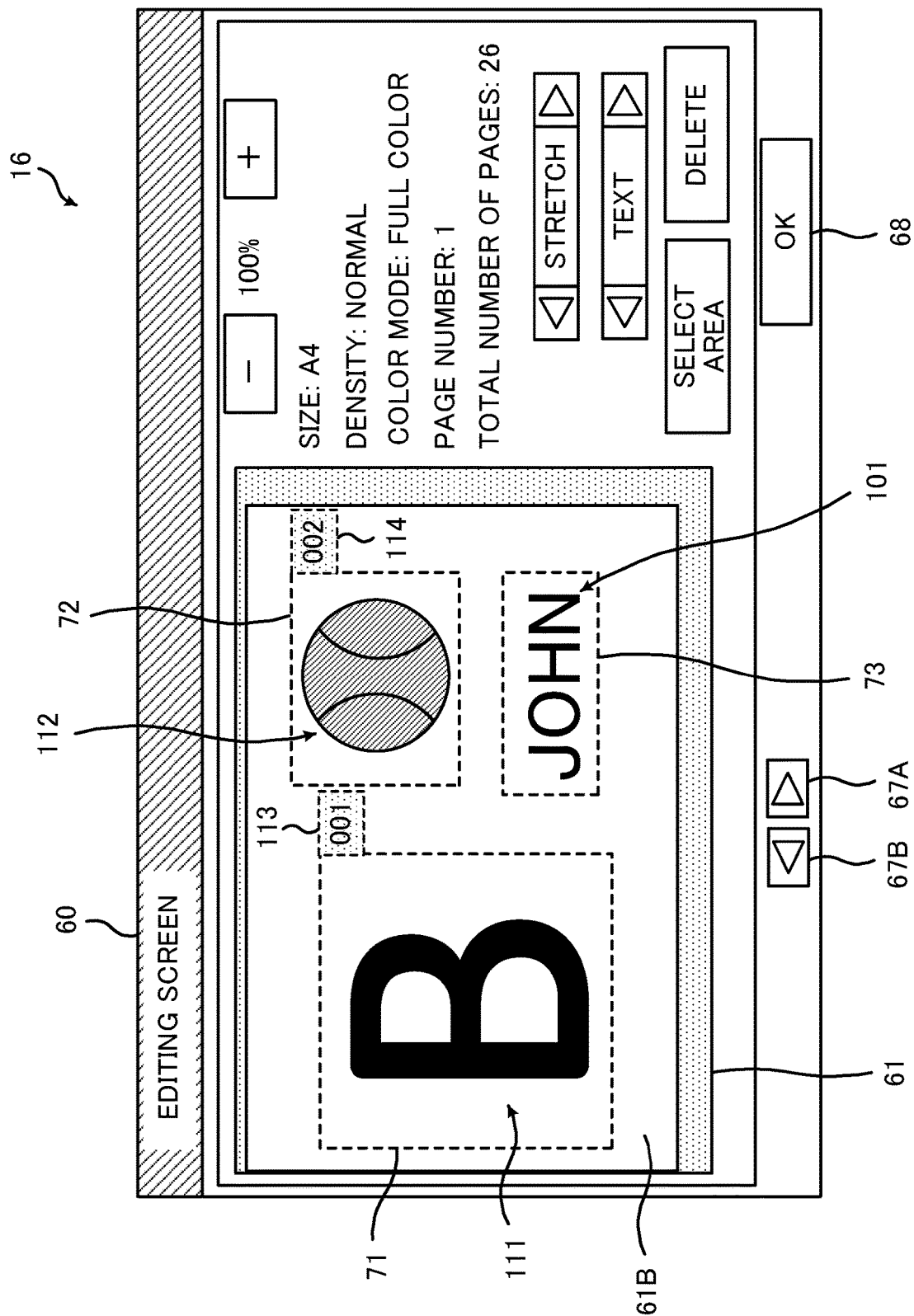
FIG. 12 is a schematic drawing showing an example of the editing screen displaying an image of a different page.

FIG. 12 illustrates an example of the editing screen displaying an image of a different page. Referring to FIG. 12, the user touches the key 67A, to change the image 61A displayed in the region 61 to the image of the next page. Upon detecting through the touch panel 15B that the key 67A has been touched, the controller 10 causes the display device 16 to display an image 61B corresponding to the second page, in the region 61.

More specifically, the controller 10 extracts the second text data from the folder 43 in the USB memory 40, on the basis of the variable data information associated with the insertion region 71, and causes the display device 16 to display the image 61B, in which a variable image 111, expressing the character "B" indicated by the second text data extracted, is located inside the frame of the insertion region 71.

At this point, the controller 10 enlarges or reduces the size of the second text data, like the case of displaying the variable image 83, such that the entirety of the variable image 111 fits in the size and shape of the insertion region 71.

The controller 10 also reads out the second image file 42B from the folder 44 in the USB memory 40, on the basis of the variable data information associated with the insertion region 72, and causes the display device 16 to display the image 61B, in which the variable image 112, representing "Ball" indicated by the image file 42B read out, is located inside the frame of the insertion region 72.

At this point, the controller 10 enlarges or reduces the size of the image file 42B, such that the long sides of the variable image 112 fits inside the frame of the insertion region 72.

The controller 10 does not change the display of the non-variable image 101 displayed in the insertion region 73. Accordingly, the controller 10 causes the display device 16 to display a character string "JOHN" indicated by the text data stored in the HDD 19 as the non-variable data in the insertion region 73, like the image 61A of the first page.

Here, when the variable image 83 or variable image 111 is displayed in the insertion region 71, the controller 10 causes the display device 16 to display information 113 expressing an identification number "001" corresponding to the folder 43, instead of displaying the button 74. Likewise, when the variable image 91 or variable image 112 is displayed in the insertion region 72, the controller 10 causes the display device 16 to display information 114 expressing an identification number "002" corresponding to the folder 44, instead of displaying the button 75.

Variable Printing Process

Figure 13:
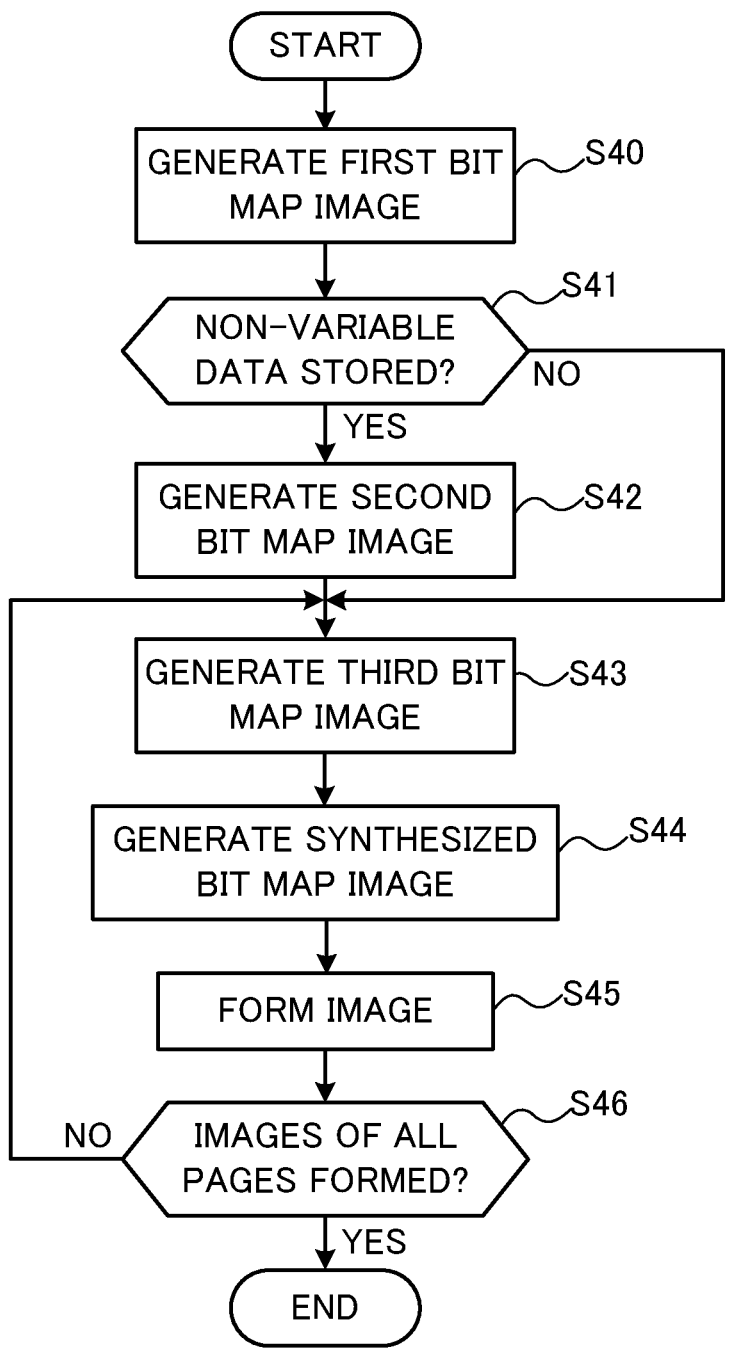
FIG. 13 is a flowchart showing a variable printing process.

FIG. 13 is a flowchart showing a variable printing process. Hereunder, a control arrangement for executing the variable printing under the variable printing program will be described, in linkage with the operation of the image forming apparatus 1.

The variable printing program is executed by the controller 10, when the user touches the key 68 on the editing screen 60 through the operation device 15, to instruct the controller 10 to start the variable printing.

After confirming the image 61B, the user touches the key 68 to input the instruction to start the variable printing. Referring to FIG. 13, upon detecting through the touch panel 15B that the key 68 has been touched, the controller 10 causes the image processing device 17 to generate a first bit map image corresponding to the fixed image (step S40).

More specifically, the controller 10 reads out the file 45, as the fixed data, from the USB memory 40, on the basis of the fixed data information stored in the HDD 19, and transfers the fixed data to the image processing device 17. The image processing device 17 performs a raster image processing on the fixed data transferred thereto, to generate the first bit map image corresponding to the fixed image in the blank state.

After the first bit map image is generated, the controller 10 decides whether the non-variable data is stored in the HDD 19 (step S41). Since the text data representing the character string "JOHN" is stored in the HDD 19 as the non-variable data, the controller 10 decides that the non-variable data is stored in the HDD 19 (YES at step S41), and causes the image processing device 17 to generate a second bit map image corresponding to the non-variable image (step S42).

More specifically, the controller 10 reads out the non-variable data, namely the text data, and the layout information of the insertion region 73 from the HDD 19, and transfers the non-variable data and the layout information to the image processing device 17. The image processing device 17 performs the raster image processing on the basis of the non-variable data and the layout information transferred thereto, to thereby generate the second bit map image corresponding to the non-variable image 101.

After the second bit map image is generated, the controller 10 causes the image processing device 17 to generate a third bit map image corresponding to the first variable image (step S43).

To be more detailed, the controller 10 extracts the first text data representing the character "A" as the variable data, from the folder 43 in the USB memory 40, on the basis of the variable data information stored in the HDD 19 in association with the insertion region 71, and also reads out the layout information of the insertion region 71 from the HDD 19. Then the controller 10 transfers the variable data and the layout information to the image processing device 17.

The controller 10 further reads out the first image file 42A as the variable data, from the folder 44 in the USB memory 40, on the basis of the variable data information stored in the HDD 19 in association with the insertion region 72, and also the layout information of the insertion region 72 from the HDD 19, and transfers the variable data and the layout information to the image processing device 17.

The image processing device 17 performs the raster image processing on the basis of the non-variable data and the layout information transferred thereto, to thereby generate the third bit map images respectively corresponding to the variable images 83 and 91.

Here, in the case where the non-variable data is not stored in the HDD 19 (NO at step S41), the controller 10 skips the operation of step S42, and proceeds to step S43.

After the third bit map image is generated, the controller 10 synthesizes the first to the third bit map images, thereby generating a synthesized bit map image corresponding to the first page (step S44). After generating the synthesized bit map image, the controller 10 causes the image forming device 12 to form the image corresponding to the first page based on the synthesized bit map image, on the recording sheet (step S45). The image formed on the recording sheet includes the variable images 83 and 91 respectively inserted in the insertion regions 71 and 72 of the fixed image, and the non-variable image 101 inserted in the insertion region 73 of the fixed image.

After the image corresponding to the first page is formed, the controller 10 decides whether the images corresponding to all the pages have been formed (step S46). Since the total number of pages of the image to be formed is twenty-six pages in this example, the controller 10 decides that the images corresponding to all the pages have not been formed (NO at step S46), and returns to step S43.

The controller 10 repeats the operations of step S43 to step S45, sequentially replacing the variable data from the second page to the twenty-sixth page, until the images corresponding to the second to the twenty-sixth pages have been formed. Upon deciding that the images corresponding to all the pages have been formed (YES at step S46), the controller 10 finishes the variable printing process.

Now, with the foregoing background art, the user utilizes, for example, a personal computer as the information processing apparatus, to generate a document image for the variable printing. To print the image from the generated document image, the user has to transmit the document image from the information processing apparatus to an image forming apparatus, which is troublesome.

According to the foregoing embodiment, in contrast, upon receipt of the instruction designating the file 45 as the fixed data, through the operation device 15, the controller 10 causes the display device 16 to display the image 61A, as the fixed image represented by the file 45 designated. Upon receipt of the drag-and-drop operation designating the position for generating the insertion region 71 in the image 61A displayed, through the operation device 15, the controller 10 generates the first position information indicating the position of the insertion region 71 in the fixed data, on the basis of the drop position, and stores the first position information in the HDD 19. Upon receipt of the instruction designating the plurality of pieces of variable data to be associated with the insertion region 71, through the operation device 15, the controller 10 acquires the first to the twenty-sixth text data as the designated plurality of pieces of variable data from the USB memory 40, through the I/F device 20. The controller 10 causes the image forming device 12 to form on the recording sheet the image, in which the variable images 83, 111, and so forth respectively represented by the first to the twenty-sixth text data, are inserted as replacement in the insertion region 71 in the fixed image represented by the file 45, with respect to each page, on the basis of the fixed data, the first position information, and the plurality of pieces of variable data acquired.

Accordingly, the user can designate the position for generating the insertion region 71 through the operation device 15, upon confirming the fixed image, namely the image 61A displayed on the display device 16 provided in the image forming apparatus 1, and also designate the plurality of pieces of variable data to be associated with the insertion region 71. Therefore, the user can easily generate the variable printing data using the image forming apparatus, without the need to depend on another information processing apparatus 23 such as a personal computer. Consequently, the user can be exempted from the trouble of transmitting the variable printing data from the information processing apparatus to the image forming apparatus, and thus the user-friendliness of the image forming apparatus can be improved.

According to the foregoing embodiment, upon receipt of the drag-and-drop operation designating the position for generating the insertion region 73 in the image 61A displayed, through the operation device 15, the controller 10 generates the second position information indicating the position of the insertion region 73 in the fixed data, on the basis of the drop position, and stores the second position information in the HDD 19. In addition, upon receipt of the instruction designating the non-variable data to be associated with the insertion region 73, through the operation device 15, the controller 10 acquires the designated non-variable data, and stores the non-variable data in the HDD 19 in association with the second position information. The controller 10 causes the image forming device 12 to form on the recording sheet the image, in which the non-variable image 101 represented by the non-variable data is inserted in the insertion region 73, in common in all pages of the fixed image represented by the file 45, on the basis of the second position information and the non-variable data.

Accordingly, the user can designate the position for generating the insertion region 73 through the operation device 15, upon confirming the fixed image, namely the image 61A displayed on the display device 16, and also designate the non-variable data to be associated with the insertion region 73. Such an arrangement further facilitates the user to generate the variable printing data.

According to the foregoing embodiment, when the character string "JOHN" is inputted to the controller 10 through the operation device 15, the controller 10 acquires the text data representing the inputted character string, as the non-variable data. Therefore, the user can generate the non-variable data, simply by inputting a desired character string through the operation device 15.

According to the foregoing embodiment, the controller 10 acquires, through the I/F device 20, the plurality of pieces of variable data stored in advance in the USB memory 40, as the plurality of pieces of variable data designated. Therefore, the user can input the plurality of pieces of variable data to the image forming apparatus 1, simply by connecting the USB memory 40 to the I/F device 20.

According to the foregoing embodiment, the controller 10 causes the display device 16 to display the value indicating the total number of the plurality of pieces of variable data, indicated by the variable data information first stored in the HDD 19. Therefore, the user can easily confirm the total number of pages of the image to be formed by the image forming apparatus 1. The user can also confirm whether the variable printing data is being correctly printed, by checking the total number of pages displayed. Such an arrangement further improves the user-friendliness of the image forming apparatus 1.

According to the foregoing embodiment, upon receipt of the instruction designating the size and shape of the insertion region 71, through the operation device 15, the controller 10 generates the size information indicating the size of the insertion region 71 with respect to the entirety of the fixed data, and the shape information indicating the shape of the insertion region 71, according to the size and shape designated, and stores the size information and the shape information in the HDD 19. Therefore, the user can designate the size and shape of the insertion region 71, in addition to the position thereof, through the operation device 15, which further facilitates the user to generate the variable printing data.

According to the foregoing embodiment, further, the text file 41 of the XML format is stored in advance in the USB memory 40, and the controller 10 acquires the first to the twenty-sixth text data included in the file 41 as the plurality of pieces of variable data, upon recognizing that the files corresponding to the designated plurality of pieces of variable data are text files. Therefore, the user can generate the variable data in the form of the text file.

According to the foregoing embodiment, further, the plurality of image files 42A to 42Z of the PNG format are stored in advance in the USB memory 40, and the controller 10 acquires the image files 42A to 42Z as the plurality of pieces of variable data, upon recognizing that the files corresponding to the designated plurality of pieces of variable data are image files. Therefore, the user can generate the variable data in the form of the image file.

First Variation

The image forming apparatus 1 according to a first variation of the disclosure is basically the same as the image forming apparatus according to the foregoing embodiment, except that the fixed data is generated through the scanning function of the image forming apparatus 1. Hereunder, the differences from the foregoing embodiment will be described.

Operation

The variable printing data generation, and the variable printing performed by the image forming apparatus 1 according to the variation will be described hereunder. The description of the same operations as those of the foregoing embodiment will not be repeated.

When the power for the image forming apparatus 1 is turned on, the controller 10 causes the display device 16 to display the home screen 30. The user connects a USB memory containing the plurality of pieces of variable data to the I/F device 20, to utilize the variable printing function.

Figure 14:
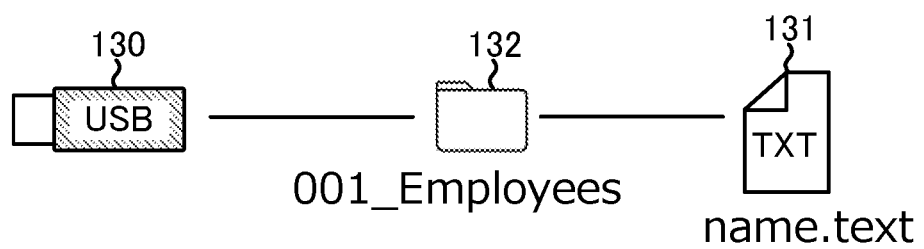
FIG. 14 is a schematic diagram showing another example of the file stored in the USB memory.

FIG. 14 illustrates another example of the file stored in the USB memory. Referring to FIG. 14, the USB memory 130 contains a text file 131 of the TXT format. The file 131 includes a plurality of pieces of variable data.

Figure 15:
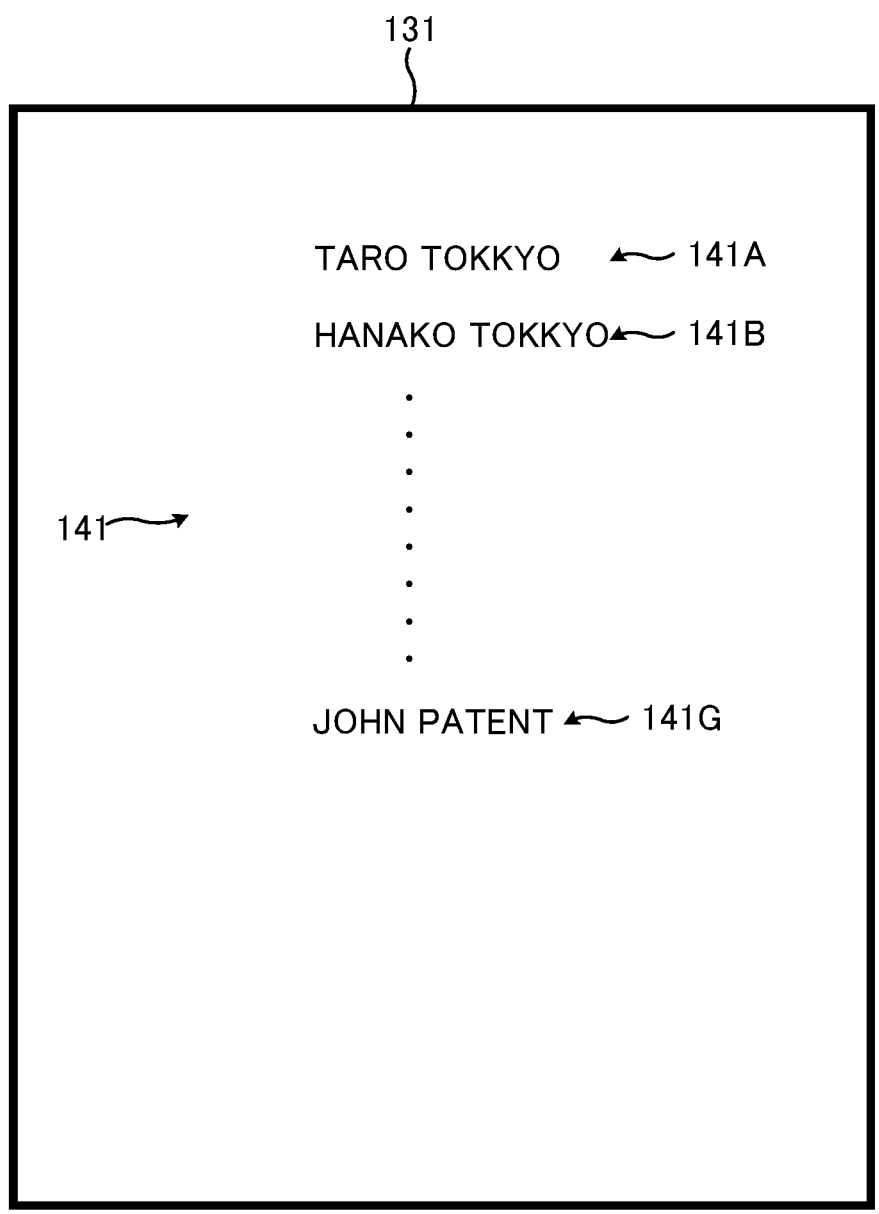
FIG. 15 is a schematic drawing showing an example of a text (TXT) file containing a plurality of pieces of variable data.

FIG. 15 illustrates an example of the TXT file including a plurality of pieces of variable data. Referring to FIG. 15, the file 131 includes, from the first line to the seventh line, first to seventh text data 141A to 141G, each indicating the name of the employee, as the variable data. The line number of the text data 141A to 141G corresponds to the order in which the variable printing is to be executed. The text data 141A to 141G constitute one group.

For example, the file 131 includes first text data 141A indicating the employee's name "TARO TOKKYO", on the first line. The file 131 includes second text data 141B indicating the employee's name "HANAKO TOKKYO", on the second line.

The file 131 is stored in a folder 132 named as "001_Employees". The numeral "001" given to the folder 132 is the identification number for identifying the variable data by group. In the USB memory 130, the folder 132 is the only folder containing the variable data.

After connecting the USB memory 130, the user touches the key 38 on the home screen 30, to thereby select the variable printing function. Upon detecting through the touch panel 15B that the key 38 has been touched, the controller 10 causes the display device 16 to display the editing screen 60.

When the editing screen 60 is displayed, the user places a source document on the platen glass of the image reading device 11. The user then presses the start key 15A provided in the operation device 15, to cause the image reading device 11 to read the source document. Thus, the user inputs the instruction designating the image file to be generated on the basis of the source document as the fixed data, by pressing the start key 15A while the editing screen 60 is displayed.

Upon detecting that the start key 15A has been touched, the controller 10 causes the image reading device 11 to read the source document placed on the platen glass, and generate the image data. The controller 10 generates, for example, the image file of the portable document format (PDF), from the image data generated, and stores such image file in the HDD 19, as the fixed data.

Figure 16:
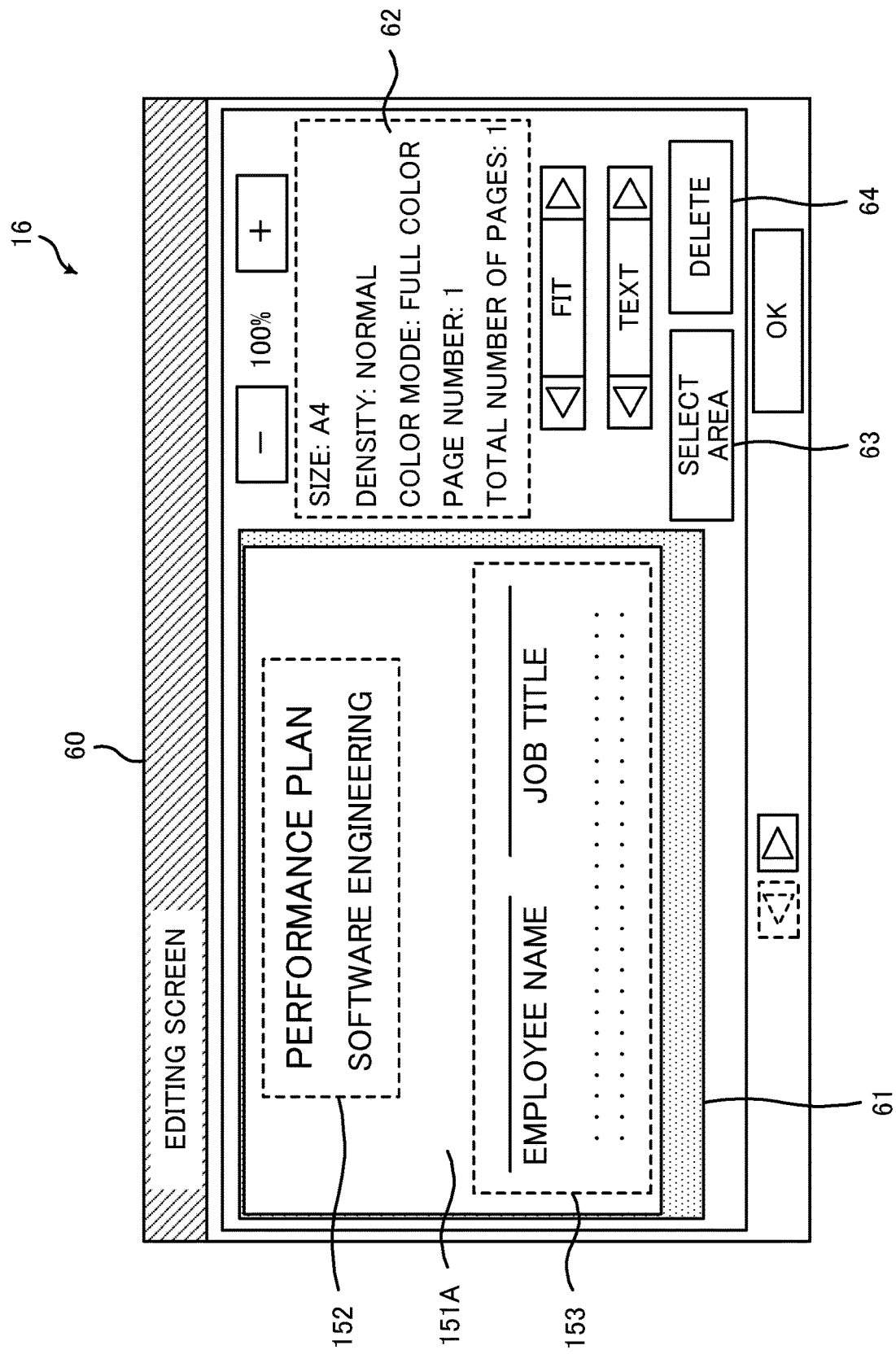
FIG. 16 is a schematic drawing showing an example of the editing screen displaying a fixed image based on a source document.

FIG. 16 illustrates an example of the editing screen displaying the fixed image based on the source document. Referring to FIG. 16, the controller 10 causes the display device 16 to display an image 151A in the region 61, on the basis of the image file generated as above. The image 151A displayed at this point is the fixed image including images 152 and 153.

Variable Printing Data Generation Process

Figure 17:
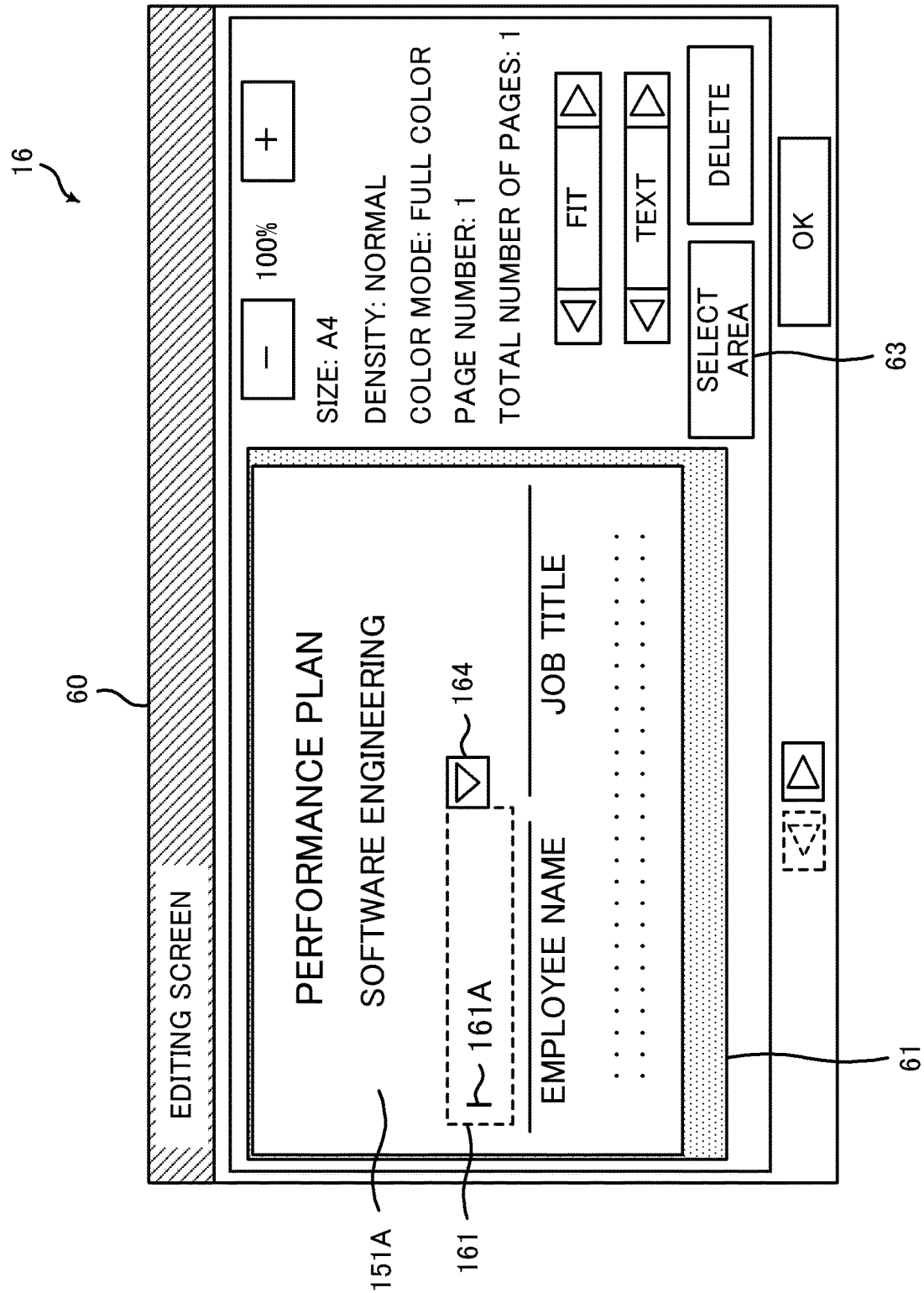
FIG. 17 is a schematic drawing showing another example of the editing screen, in which the insertion region is generated.

FIG. 17 illustrates another example of the editing screen, in which the insertion region is generated. The user drags and drops the key 63 at a desired position on the image 151A displayed in the region 61, to input the instruction to generate the insertion region.

Referring to FIG. 7A and FIG. 17, upon detecting through the touch panel 15B that the key 63 has been dragged and dropped, the controller 10 causes the display device 16 to display an insertion region 161 of a size and shape predetermined as default, at the drop position (step S11).

The controller 10 also generates the layout information, including the position information indicating the position of the insertion region 161 in the fixed data, in other words the image file generated, the size information indicating the size of the insertion region 161 with respect to the entirety of the fixed data, and the shape information indicating the shape of the insertion region 161, and stores the layout information in the HDD 19 (step S12). The insertion region 161 exemplifies the first region in What is claimed is. The position information of the insertion region 161 exemplifies the first position information in What is claimed is.

The controller 10 causes the display device 16 to display the insertion region 161, surrounded by a frame drawn in broken lines, indicating the size and shape of the insertion region 161. The insertion region 161 includes, inside the frame thereof, a cursor 161A indicating the position where characters or numerals for constituting the non-variable image are to be inputted.

The user can input an instruction to change the position of the insertion region 161, by dragging and dropping a position inside the frame of the insertion region 161. The user can also input an instruction to change the size or shape of the insertion region 161, by dragging and dropping the frame of the insertion region 161.

Upon detecting the drag-and-drop operation performed on the frame, or on the position inside the frame of the insertion region 161, through the touch panel 15B, the controller 10 causes the display device 16 to display the insertion region 161 located at a different position, and in a different size and shape, in accordance with the drag-and-drop operation detected. The controller 10 also updates the layout information of the insertion region 161 stored in the HDD 19, so as to reflect the changes in position, size, and shape.

After storing the layout information, the controller 10 stands by for receipt of an instruction for designating the plurality of pieces of variable data to be associated with the insertion region (NO at step S13), or for receipt of an instruction for designating the non-variable data to be associated with the insertion region (NO at step S24). The user touches a button 164 displayed close to the insertion region 161, to designate the plurality of pieces of variable data to be associated with the insertion region 161.

Upon detecting through the touch panel 15B that the button 164 has been touched, the controller 10 decides that the instruction for designating the plurality of pieces of variable data to be associated with the insertion region 161 has been received (YES at step S13), and extracts all the folder names having the identification number, from the information stored in the USB memory 130 (step S14). In this example, the controller 10 extracts the folder name "001_Employees", from the information stored in the USB memory 130.

After extracting the folder name, the controller 10 decides whether a plurality of folder names have been extracted (step S15). Since only one folder name has been extracted in this example, the controller 10 decides that a plurality of folder names have not been extracted (NO at step S15), and identifies the plurality of pieces of variable data to be associated with the insertion region 161 according to the file 131 stored in the folder 132 in the USB memory 130, without displaying the pulldown list including the folder names as items. Then the controller 10 stores the variable data information indicating the plurality of pieces of variable data identified, in the HDD 19 in association with the layout information of the insertion region 161 (step S18).

More specifically, upon recognizing that the file 131 stored in the folder 132 is a TXT file, in other words a text file, the controller 10 identifies the first to the seventh text data 141A to 141G, as the plurality of pieces of variable data to be associated with the insertion region 161, and stores the variable data information indicating the plurality of pieces of variable data identified in the HDD 19, in association with the layout information of the insertion region 161.

In this example, the controller 10 stores the path of the folder 132, the file format of the file 131, and the information indicating the first to the seventh text data 141A to 141G in the HDD 19, as the variable data information.

The controller 10 also stores the setting information indicating that the layout of the insertion image is set to "fit", in association with the layout information of the insertion region 161, in the HDD 19 (step S19).

FIG. 18 illustrates another example of the editing screen displaying the variable image. Referring to FIG. 18, after storing the setting information the controller 10 extracts first text data 141A from the folder 132 in the USB memory 130, on the basis of the variable data information associated with the insertion region 161, and causes the display device 16 to erase the display of the cursor 161A, and display the image 151A, in which a variable image 171, expressing the character string "TARO TOKKYO" indicated by the first text data 141A extracted, is located inside the frame of the insertion region 161 (step S20).

Since "fit" is selected as the layout of the insertion image, the controller 10 enlarges or reduces the size of the text data 141A, such that the entirety of the variable image 171 fits in the size and shape of the insertion region 161.

Referring to FIG. 7B, after the variable image 171 is displayed, the controller 10 decides whether the variable data information stored at step S18 is the variable data information first stored in the HDD 19, with respect to the fixed data that is the object of the variable printing data generation (step S21). In this example, the controller 10 decides that the variable data information associated with the insertion region 161 is the variable data information first stored in the HDD 19 (YES at step S21), and determines the total number of pieces of the variable data indicated by the variable data information, as the total number of pages of the image displayed in the region 61 (step S22).

More specifically, the controller 10 determines the value "7", which is the total number of pieces of the first to the seventh text data 141A to 141G indicated by the variable data information associated with the insertion region 161, as the total number of pages of the image displayed in the region 61. The controller 10 changes the information indicating the total number of pages, currently displayed in the region 62, from "1" to "7" in accordance with the value determined as above (step S23). Upon changing the total number of pages, the controller 10 finishes the variable printing data generation.

Through the mentioned process, the controller 10 stores the fixed data information, the variable data information, the layout information of the insertion region 161, and the setting information, which are the constituents of the variable printing data, in the HDD 19.

FIG. 19 illustrates another example of the editing screen displaying the image of a different page. Referring to FIG. 19, the user touches the key 67A, to change the image 151A displayed in the insertion region 161 to the image of the next page. Upon detecting through the touch panel 15B that the key 67A has been touched, the controller 10 causes the display device 16 to display an image 151B corresponding to the second page, in the region 61.

More specifically, the controller 10 extracts the second text data 141B from the folder 132 in the USB memory 130, on the basis of the variable data information associated with the insertion region 161, and causes the display device 16 to display the image 151B, in which a variable image 181, expressing the character string "HANAKO TOKKYO" indicated by the second text data 141B extracted, is located inside the frame of the insertion region 161.

At this point, the controller 10 enlarges or reduces the size of the second text data 141B, like the case of displaying the variable image 171, such that the entirety of the variable image 181 fits in the size and shape of the insertion region 161.

Here, when the variable image 171 or variable image 181 is displayed in the insertion region 161, the controller 10 causes the display device 16 to display information 182 expressing an identification number "001" corresponding to the folder 132, instead of displaying the button 164.

Variable Printing Process

After confirming the image 151B, the user touches the key 68 to input the instruction to start the variable printing. Referring to FIG. 13, upon detecting through the touch panel 15B that the key 68 has been touched, the controller 10 causes the image processing device 17 to generate the first bit map image corresponding to the fixed image (step S40).

More specifically, the controller 10 reads out the image file stored as the fixed data, from the HDD 19, and transfers the fixed data to the image processing device 17. The image processing device 17 performs a raster image processing on the fixed data transferred thereto, to generate the first bit map image corresponding to the fixed image including the images 152 and 153.

After the first bit map image is generated, the controller 10 decides whether the non-variable data is stored in the HDD 19 (step S41). Since the non-variable data is not stored in the HDD 19 in this example, the controller 10 decides that the non-variable data is not stored in the HDD 19 (NO at step S41), and causes the image processing device 17 to generate the third bit map image corresponding to the first variable image, without generating the second bit map image (step S43).

More specifically, the controller 10 extracts the first text data 141A representing the character string "TARO TOK-KYO" from the folder 132 in the USB memory 130, according to the variable data information stored in the HDD 19 in association with the insertion region 161. The controller 10 also reads out the layout information of the insertion region 161 from the HDD 19, and transfers the first text data 141A and the layout information to the image processing device 17.

The image processing device 17 performs the raster image processing on the basis of the variable data and the layout information transferred thereto, to thereby generate the third bit map image corresponding to the variable image 171.

After the third bit map image is generated, the controller 10 synthesizes the first to the third bit map images, thereby generating the synthesized bit map image corresponding to the first page (step S44). After generating the synthesized bit map image, the controller 10 causes the image forming device 12 to form the image corresponding to the first page based on the synthesized bit map image, on the recording sheet (step S45). The image formed on the recording sheet includes the variable image 171 inserted in the insertion region 161 of the fixed image including the images 152 and 153.

After the image corresponding to the first page is formed, the controller 10 decides whether the images corresponding to all the pages have been formed (step S46). Since the total number of pages of the image to be formed is seven pages in this example, the controller 10 decides that the images corresponding to all the pages have not been formed (NO at step S46), and returns to step S43.

The controller 10 repeats the operations of step S43 to step S45 as above, sequentially replacing the variable data from the second page to the seventh page, until the images corresponding to the second to the seventh pages have been formed. Upon deciding that the images corresponding to all the pages have been formed (YES at step S46), the controller 10 finishes the variable printing process.

According to the first variation, upon receipt of the instruction designating the image file based on the source document as the fixed data, through the operation device 15, the controller 10 causes the image reading device 11 to generate the image data based on the source document. The controller 10 then generates the image file from the image data generated, and causes the display device 16 to display the image 151A represented by the image file, as the fixed image.

Therefore, the user can generate the fixed data, simply by causing the image reading device 11 to read the source document. In addition, the user can easily confirm the fixed image represented by the fixed data, which leads to further improvement in user-friendliness.

Other Variations

Although the variable data is stored in the USB memory in the form of the text file of the XML format or TXT format, or in the form of the image file of the PNG format in the foregoing embodiment, the disclosure is not limited to such an embodiment. For example, the variable data may be stored in the form of an image file of the joint photographic experts group (JPG) format or graphic interchange format (GIF) format, or in the form of a text file of the comma separated value (CSV) format.

Although the fixed data is stored in the HDD 19 in the PDF format or a word processor-compatible format in the foregoing embodiment, the disclosure is not limited to such an embodiment. For example, the fixed data may be stored in the form of a file of the JPG format or GIF format.

In the foregoing embodiment, the controller 10 determines the total number of the plurality of pieces of variable data indicated by the variable data information first stored in the HDD 19, as the total number of pages of the image displayed in the region 61. However, the disclosure is not limited to such an embodiment. For example, the controller 10 may determine the total number of pages each time the controller 10 stores the variable data information in the HDD 19, and change the value indicating the total number of pages displayed in the region 62 to the determined value, when the determined value exceeds the value indicating the total number of pages currently displayed in the region 62.

Although the I/F device 20 is employed as an example of the data input device in the foregoing embodiment, the disclosure is not limited to such an embodiment. It suffices that the data input device allows the variable data to be inputted to the image forming apparatus 1, and the data input device may be, for example, the communication device 22. When the communication device 22 is employed as the data input device, the variable data transmitted from the external information processing apparatus 23 is inputted to the image forming apparatus 1, through the communication device 22.

Further, although the image forming device 12 forms the image on the recording sheet in the foregoing embodiment, the disclosure is not limited to such an embodiment. The image forming device 12 may form the image on other types of recording medium, without limitation to the recording sheet. Examples of other types of recording medium include an overhead projector (OHP) sheet.

The disclosure may be modified in various manners, without limitation to the foregoing embodiment. For example, although the embodiment takes up the color MFP as an example of the image forming apparatus according to the disclosure, the disclosure is also applicable to a monochrome MFP, and to various other image forming apparatuses, such as printers, copiers and facsimile machines.

The configurations and processings described with reference to FIG. 1 and FIG. 19 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:
1. An image forming apparatus comprising:
   a storage device;
   an instruction input device into which an instruction of a user is inputted;
   a data input device into which a plurality of pieces of variable data are inputted;
   an image forming device that forms an image on a recording medium;
   a display device; and a control device including a processor, and configured to act, when the processor executes a control program, as a controller that:
  causes the display device, upon receipt of an instruction designating fixed data through the instruction input device, to display a fixed image represented by the designated fixed data;
  generates, upon receipt of an instruction designating a position for generating a first region in the displayed fixed image through the instruction input device, a first position information indicating the position of the first region in the fixed data on a basis of the designated position, and stores the first position information in the storage device;
  acquires, upon receipt of an instruction designating the plurality of pieces of variable data to be associated with the first region through the instruction input device, the designated plurality of pieces of variable data through the data input device; and
  causes the image forming device to form on the recording medium an image, in which an variable image represented by each of the acquired plurality of pieces of variable data is inserted as replacement, for each page, in the first region in the fixed image on a basis of the fixed data, the first position information, and the acquired plurality of pieces of variable data,
wherein the controller:
  generates, upon receipt of an instruction designating a size and shape of the first region through the instruction input device, size information indicating a size of the first region with respect to an entirety of the fixed data, and shape information indicating a shape of the first region, according to the designated size and shape, and stores the size information and the shape information in the storage device; and
causes the image forming device to form on the recording medium the image, in which the variable image is inserted as replacement, for each page, in the first region of the size indicated by the size information and the shape indicated by the shape information.

2. The image forming apparatus according to claim 1, wherein the controller:
  generates, upon receipt of an instruction designating a position for generating a second region different from the first region in the displayed fixed image through the instruction input device, second position information indicating the position of the second region in the fixed data on a basis of the designated position, and stores the second position information in the storage device;
  acquires, upon receipt of an instruction designating non-variable data to be associated with the second region through the instruction input device, the designated non-variable data, and stores the acquired non-variable data in the storage device in association with the second position information; and
  causes the image forming device to form on the recording medium the image, in which a non-variable image represented by the non-variable data is inserted in the second region, in common in all pages of the fixed image on a basis of the second position information and the non-variable data.

3. The image forming apparatus according to claim 2, wherein the controller acquires, when a character string is inputted through the instruction input device, text data representing the inputted character string, as the non-variable data.

4. The image forming apparatus according to claim 3, wherein the data input device includes an interface device to which an external storage device can be connected, and
the controller acquires, through the interface device, the plurality of pieces of variable data stored in advance in the external storage device, as the designated plurality of pieces of variable data.

5. The image forming apparatus according to claim 4, wherein the external storage device stores a text file in advance, and
the controller acquires, upon recognizing that a file corresponding to the designated plurality of pieces of variable data is the text file, a plurality of pieces of text data included in the text file as the plurality of pieces of variable data.

6. The image forming apparatus according to claim 4, wherein the external storage device stores a plurality of image files in advance, and
the controller acquires, upon recognizing that files corresponding to the designated plurality of pieces of variable data is the image files, the plurality of image files as the plurality of pieces of variable data.

7. The image forming apparatus according to claim 4, wherein the controller acquires through the interface device, fixed data stored in advance in the external storage device, as the designated fixed data.

8. The image forming apparatus according to claim 6, wherein the controller causes the display device to display a value indicating a total number of the plurality of pieces of variable data.

9. The image forming apparatus according to claim 1, further comprising an image reading device that reads a source document and generates image data,
wherein, upon receipt of an instruction designating an image file based on the source document as the fixed data through the instruction input device, the controller causes the image reading device to generate image data based on the source document, generates the image file from the generated image data, and causes the display device to display an image represented by the generated image file.

* * * * *